US012621721B2

(12) United States Patent
Nguyen et al.

(10) Patent No.: US 12,621,721 B2
(45) Date of Patent: May 5, 2026

(54) SIDELINK FEEDBACK MANAGEMENT DURING A SAME CHANNEL CO-EXISTENCE

(71) Applicant: QUALCOMM Incorporated, San Diego, CA (US)

(72) Inventors: Tien Viet Nguyen, Bridgewater, NJ (US); Sourjya Dutta, San Diego, CA (US); Gabi Sarkis, San Diego, CA (US)

( * ) Notice: Subject to any disclaimer, the term of this patent is extended or adjusted under 35 U.S.C. 154(b) by 394 days.

(21) Appl. No.: 18/315,397

(22) Filed: May 10, 2023

(65) Prior Publication Data

US 2024/0381184 A1     Nov. 14, 2024

(51) Int. Cl.
*H04W 28/26*         (2009.01)
*H04W 72/40*         (2023.01)
*H04W 72/563*        (2023.01)

(52) U.S. Cl.
CPC .......... *H04W 28/26* (2013.01); *H04W 72/40* (2023.01); *H04W 72/563* (2023.01)

(58) Field of Classification Search
CPC .... H04W 28/26; H04W 72/40; H04W 72/563
See application file for complete search history.

(56) References Cited

U.S. PATENT DOCUMENTS

| | | | |
|---|---|---|---|
| 2022/0086700 A1 | 3/2022 | Nguyen et al. | |
| 2024/0292454 A1* | 8/2024 | Kim ...................... | H04W 88/06 |
| 2024/0313906 A1* | 9/2024 | Panzner ............... | H04L 1/1854 |

FOREIGN PATENT DOCUMENTS

| | | |
|---|---|---|
| EP | 4358627 A1 | 4/2024 |
| WO | 2022265445 A1 | 12/2022 |

OTHER PUBLICATIONS

International Search Report and Written Opinion—PCT/US2024/024650—ISA/EPO—Aug. 9, 2024.

* cited by examiner

*Primary Examiner* — Kenny S Lin

(57) ABSTRACT

Certain aspects of the present disclosure provide a method for wireless communications at a first user equipment (UE). The first UE may detect at least one condition related to first resources reserved for sidelink transmissions in a first radio access technology (RAT). The first UE may perform one or more actions, based on the detection, to limit feedback request for sidelink transmissions in a second RAT.

20 Claims, 16 Drawing Sheets

800

702

850

LTE V2X/NR V2X system

FIG. 10

LTE V2X Car

LTE V2X/NR V2X Car

LTE V2X Link

NR V2X Link

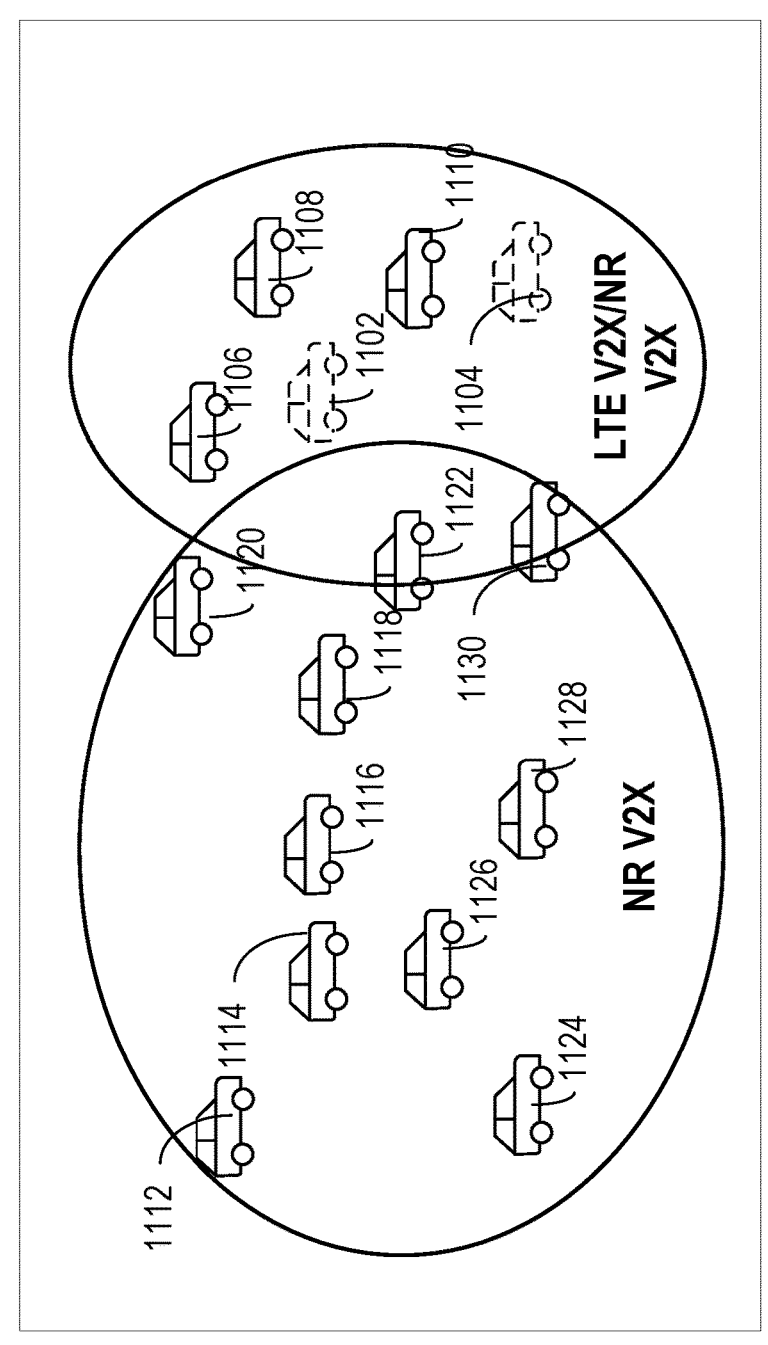
1100
*FIG. 11*
LTE V2X Car
LTE V2X/NR V2X Car
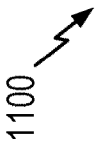

NR V2X System
1200
FIG. 12
LTE V2X/NR V2X Car

1600

A method for wireless communications at a first user equipment (UE), including

1610

Detecting at least one condition related to first resources reserved for sidelink transmissions in a first radio access technology (RAT)

1620

Performing one or more actions, based on the detection, to limit feedback request for sidelink transmissions in a second RAT

SIDELINK FEEDBACK MANAGEMENT DURING A SAME CHANNEL CO-EXISTENCE

BACKGROUND

Field of the Disclosure

Aspects of the present disclosure relate to wireless communications, and more particularly, to techniques for managing sidelink feedback-based transmissions in a multiple radio access technology (RAT) scenario with a same channel co-existence.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by a first user equipment (UE). The method includes detecting at least one condition related to first resources reserved for sidelink transmissions in a first radio access technology (RAT); and performing one or more actions, based on the detection, to limit feedback request for sidelink transmissions in a second RAT.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 10 depicts another example LTE V2X-NR V2X system.

FIG. 11 depicts example NR V2X system and example LTE V2X-NR V2X system.

FIG. 12 depicts example NR V2X system.

DETAILED DESCRIPTION

Figure 1:
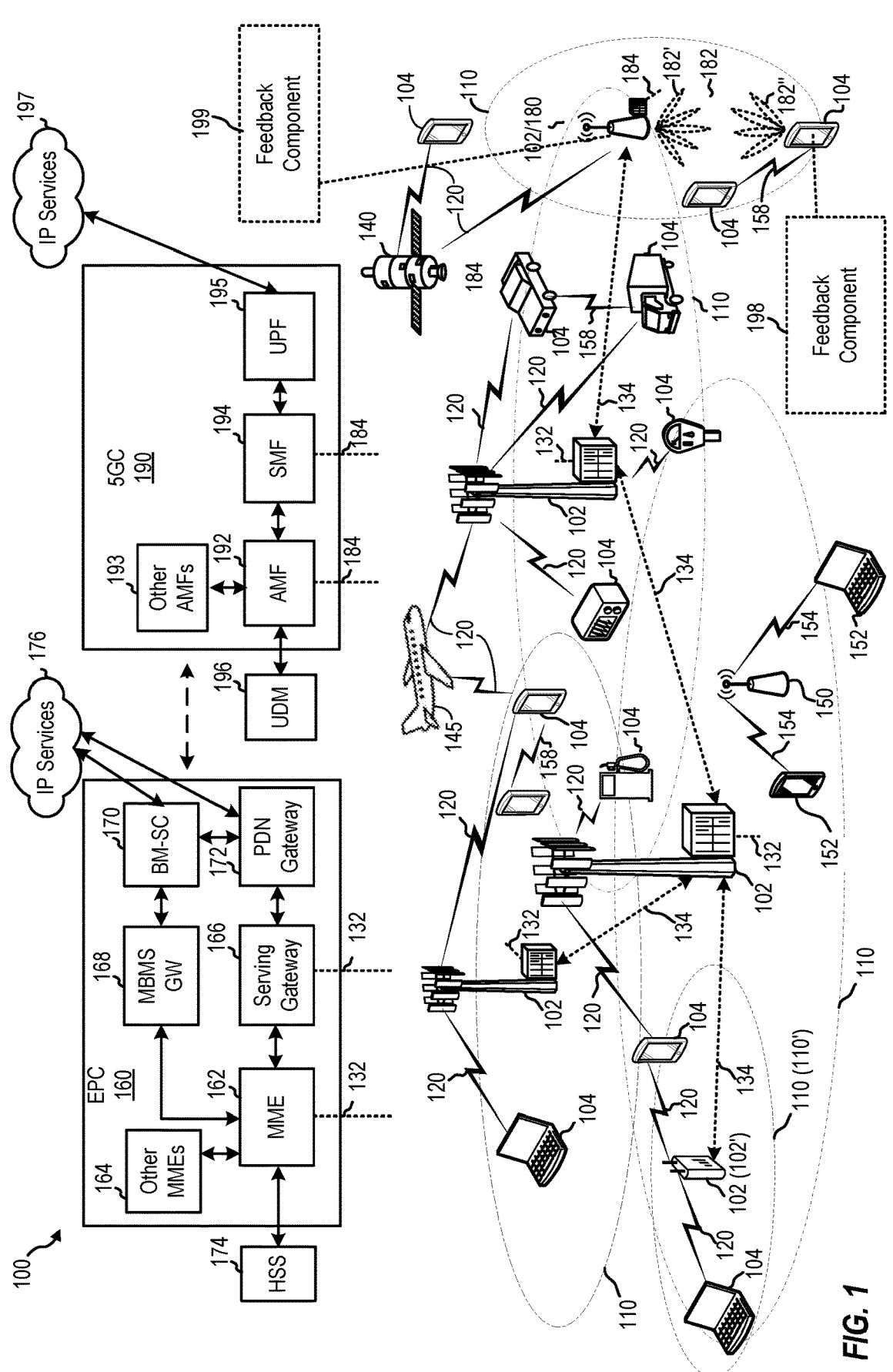
FIG. 1 depicts an example wireless communications network.

Aspects of the present disclosure provide apparatuses, methods, processing systems, and computer-readable mediums for managing sidelink feedback-based transmissions in a multiple radio access technology (RAT) scenario with a same channel co-existence.

In some networks, user equipments (UEs) may be capable of communicating directly with each other using sidelink signals. Real-world applications of sidelink communications may include UE-to-network relaying, vehicle-to-vehicle (V2V) communications, vehicle-to-everything (V2X) communications, Internet of Everything (IoE) communications, IoT communications, mission-critical mesh, and/or various other suitable applications. A sidelink signal generally refers to a signal communicated from one UE to another UE without relaying that communication through a scheduling entity (e.g., a UE or a network entity), even though the scheduling entity may be utilized for scheduling and/or control purposes.

In some cases, a UE operating on a first RAT (e.g., a long term evolution (LTE) V2X UE) and a UE operating on a second RAT (e.g., a new radio (NR) V2X UE) may exist and operate on overlapping frequency resources (e.g., in a same channel). In such cases, LTE V2X transmissions and NR V2X transmissions may collide (e.g., since allocated transmission resources may overlap in both time and frequency) when there is no coordination between the UEs for resource selection. In one example, a NR physical sidelink feedback channel (PSFCH) may collide with an LTE physical sidelink control channel (PSCCH)/physical sidelink shared channel (PSSCH).

In some cases, the NR V2X UE may transmit an NR PSCCH/PSSCH, which may require a feedback based retransmission. In such cases, another NR V2X UE (which receives the NR PSCCH/PSSCH) transmits a PSFCH signal (e.g., in response to the received NR PSCCH/PSSCH) in a corresponding PSFCH slot, which may be located later than an NR PSSCH transmission slot. In some cases, the NR V2X UE may avoid NR PSCCH/PSSSCH transmissions with the corresponding NR PSFCH slot overlapping with LTE V2X resource reservations in a time domain. Since each NR PSFCH slot can be associated with up to four NR PSCCH/PSSCH slots, a single LTE V2X resource reservation may prevent the NR V2X UE from selecting NR PSCCH/PSSCH resources in four slots. This may severely limit the possible choices of the resources for the NR V2X UE for NR V2X transmissions. On the other hand, if the NR PSCCH/PSSCH does not require the feedback based retransmission, such limitation may not be applicable.

In an effort to prevent exclusion of a high number of the resources for the NR V2X transmissions, techniques described herein may be implemented to disable sidelink feedback-based transmissions only under some specific conditions. For example, the NR V2X UE may disable a requesting feedback (e.g., a request for a feedback) for PSCCH/PSSCH transmissions, when the NR V2X UE detects at least N number of the LTE V2X resource reservations.

Particular aspects of the subject matter described in this disclosure can be implemented to realize one or more of the following potential advantages. In some examples, the described techniques can be used to enhance co-existence between LTE V2X transmissions and the NR V2X transmissions within the same channel, provide flexibility in scheduling, and make more efficient use of resources.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio BS, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
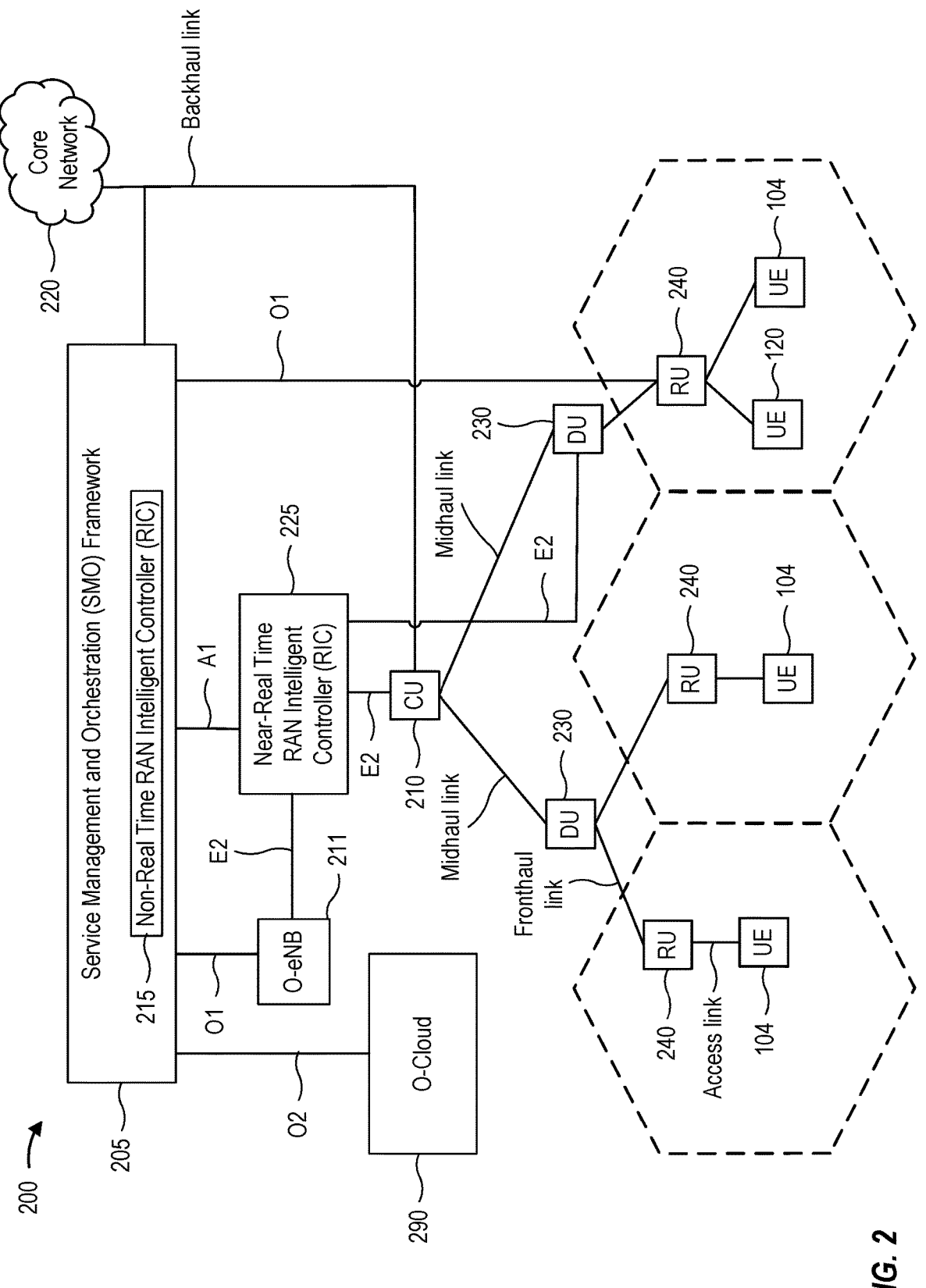
FIG. 2 depicts an example disaggregated base station (BS) architecture.

While BSs 102 are depicted in various aspects as unitary communications devices, BSs 102 may be implemented in various configurations. For example, one or more components of a BS 102 may be disaggregated, including a central unit (CU), one or more distributed units (DUs), one or more radio units (RUS), a Near-Real Time (Near-RT) RAN Intelligent Controller (RIC), or a Non-Real Time (Non-RT) RIC, to name a few examples. In another example, various aspects of a BS 102 may be virtualized. More generally, a BS (e.g., BS 102) may include components that are located at a single physical location or components located at various physical locations. In examples in which a BS 102 includes components that are located at various physical locations, the various components may each perform functions such that, collectively, the various components achieve functionality that is similar to a BS 102 that is located at a single physical location. In some aspects, a BS 102 including components that are located at various physical locations may be referred to as a disaggregated radio access network (RAN) architecture, such as an Open RAN (O-RAN) or Virtualized RAN (VRAN) architecture. FIG. 2 depicts and describes an example disaggregated BS architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHZ-6 GHz, which is often referred to (interchangeably) as "Sub-6 GHz". Similarly, 3GPP currently defines Frequency Range 2 (FR2) as including 26-41 GHZ, which is sometimes referred to (interchangeably) as a "millimeter wave" ("mmW" or "mmWave"). A BS configured to communicate using mm Wave/near mm Wave radio frequency bands (e.g., a mmWave BS such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain BSs (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs)

152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

Figure 16:
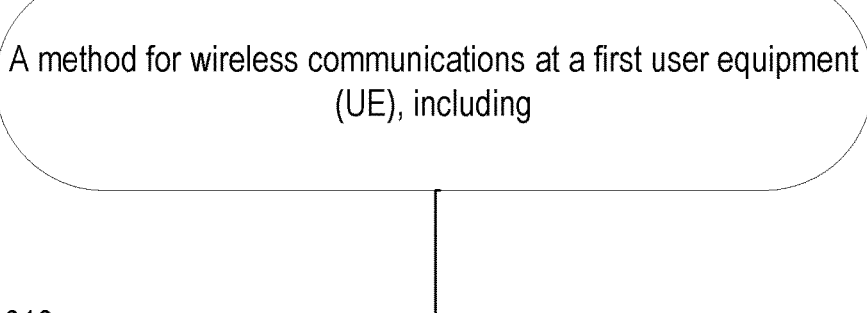
FIG. 16 depicts a method for wireless communications at a first UE.

Wireless communication network 100 further includes feedback component 198, which may be configured to perform method 1600 of FIG. 16. Wireless communication network 100 further includes feedback component 199.

In various aspects, a network entity or network node can be implemented as an aggregated BS, as a disaggregated BS, a component of a BS, an integrated access and backhaul (IAB) node, a relay node, a sidelink node, to name a few examples.

FIG. 2 depicts an example disaggregated BS 200 architecture. The disaggregated BS 200 architecture may include one or more central units (CUs) 210 that can communicate directly with a core network 220 via a backhaul link, or indirectly with the core network 220 through one or more disaggregated BS units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more BS functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an Al interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
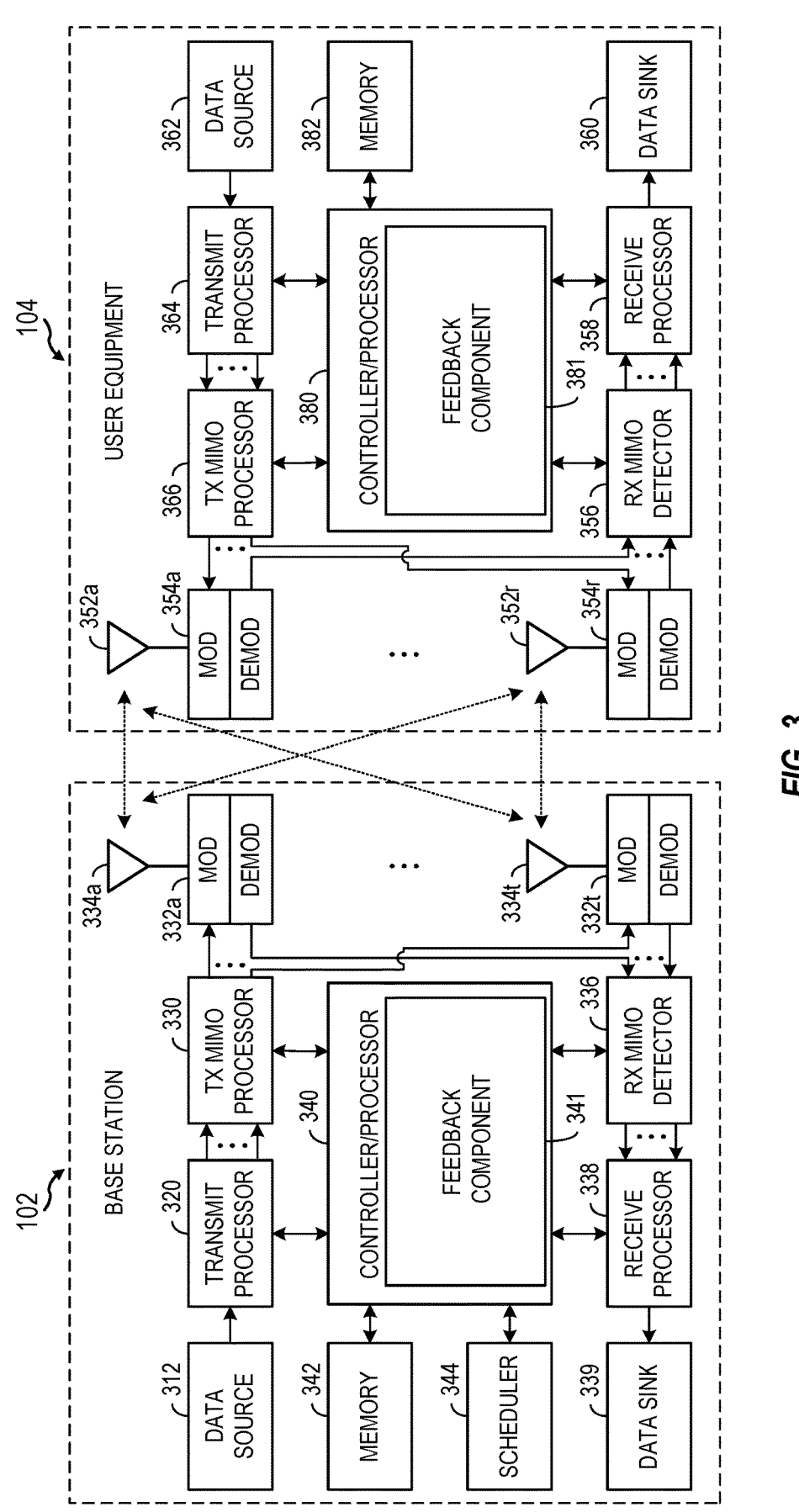
FIG. 3 depicts aspects of an example BS and an example user equipment (UE).

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

BS 102 includes controller/processor 340, which may be configured to implement various functions related to wireless communications. In the depicted example, controller/processor 340 includes feedback component 341, which may be representative of feedback component 199 of FIG. 1. Notably, while depicted as an aspect of controller/processor 340, feedback component 341 may be implemented additionally or alternatively in various other aspects of BS 102 in other implementations.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

UE 104 includes controller/processor 380, which may be configured to implement various functions related to wireless communications. In the depicted example, controller/processor 380 includes feedback component 381, which may be representative of feedback component 198 of FIG. 1. Notably, while depicted as an aspect of controller/processor 380, feedback component 381 may be implemented additionally or alternatively in various other aspects of UE 104 in other implementations.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a-332t*. Each modulator in transceivers 332*a-332t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a-332t* may be transmitted via the antennas 334*a-334t*, respectively.

In order to receive the downlink transmission, UE 104 includes antennas 352*a-352r* that may receive the downlink signals from the BS 102 and may provide received signals to the demodulators (DEMODs) in transceivers 354*a-354r*, respectively. Each demodulator in transceivers 354*a-354r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a-354r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a-354r* (e.g., for SC-FDM), and transmitted to BS 102.

At BS 102, the uplink signals from UE 104 may be received by antennas 334*a-t*, processed by the demodulators in transceivers 332*a-332t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
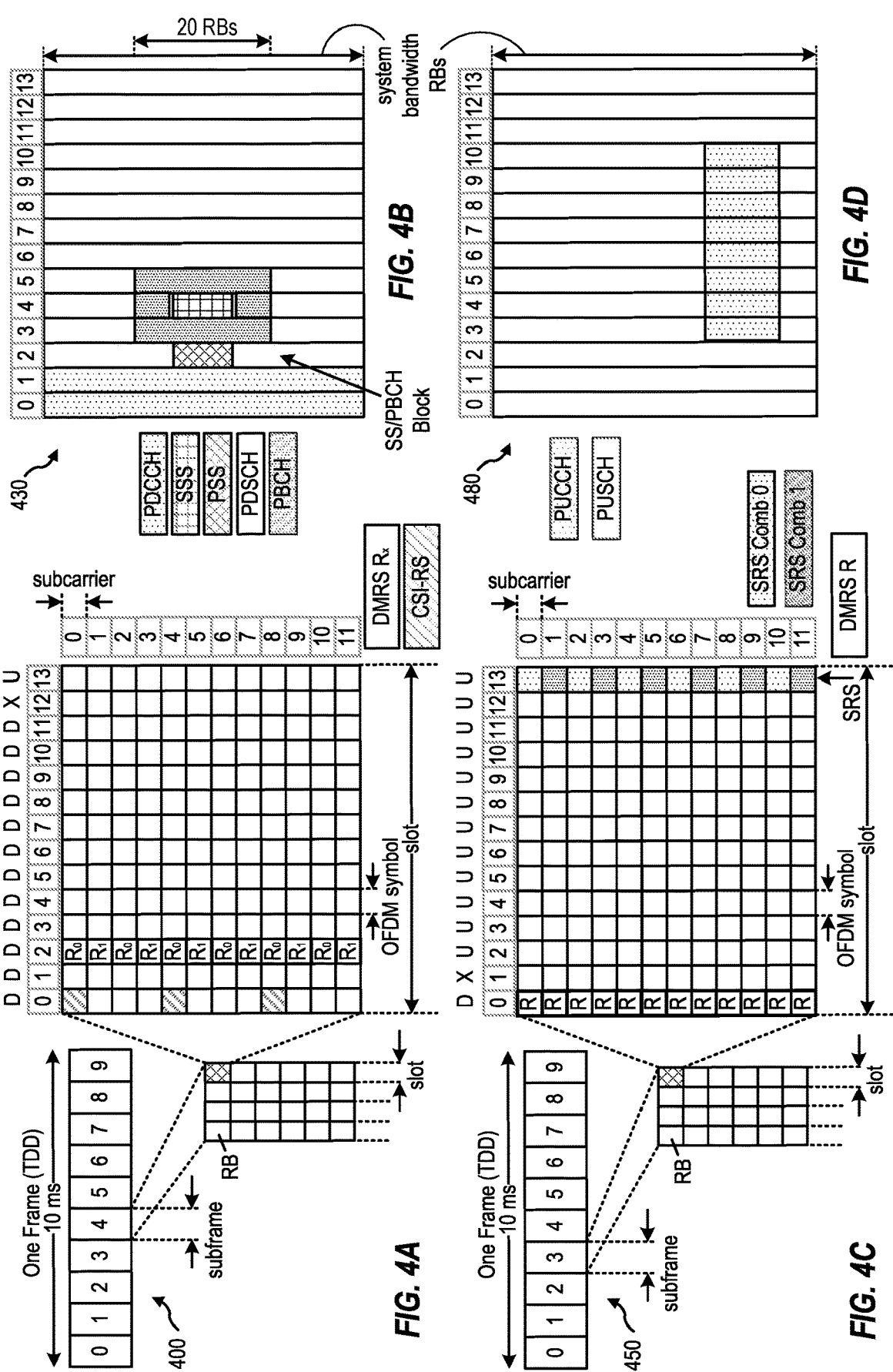
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where Dis DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A. 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the BS. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a BS for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5th generation (5G) networks may utilize several frequency ranges, which in some cases are defined by a standard, such as 3rd generation partnership project (3GPP) standards. For example, 3GPP technical standard TS 38.101 currently defines Frequency Range 1 (FR1) as including 600 MHZ-6 GHZ, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (BS) (e.g., 180) configured to communicate using mmWave/near mmWave radio frequency bands may utilize beamforming (e.g., 182) with a user equipment (UE) (e.g., 104) to improve path loss and range.

Overview of Sidelink Systems

User equipments (UEs) communicate with each other using sidelink signals. Real-world applications of sidelink communications may include UE-to-network relaying, vehicle-to-vehicle (V2V) communications, vehicle-to-everything (V2X) communications, Internet of Everything (IoE) communications, IoT communications, mission-critical mesh, and/or various other suitable applications.

A sidelink signal refers to a signal communicated from one UE to another UE without relaying that communication through a scheduling entity (e.g., a UE or a network entity), even though the scheduling entity may be utilized for scheduling and/or control purposes. In some cases, the sidelink signal is communicated using a licensed spectrum (e.g., unlike wireless local area networks, which use an unlicensed spectrum). One example of sidelink communication is PC5, for example, as used in V2V, long term evolution (LTE), and/or new radio (NR).

Various sidelink channels are used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH carries discovery expressions that enable proximal UEs to discover each other. The PSCCH carries control signaling such as sidelink resource configurations, resource reservations, and other parameters used for data transmissions. The PSSCH carries data transmissions. The PSFCH carries a feedback such as acknowledgement (ACK) and/or negative ACK (NACK) information corresponding to transmissions on the PSSCH.

In some NR systems, a two stage sidelink control information (SCI) is supported. The two stage SCI includes a first stage SCI (e.g., SCI-1) and a second stage SCI (e.g., SCI-2). The SCI-1 includes resource reservation and allocation information. The SCI-2 includes information that can be used to decode data and to determine whether a UE is an intended recipient of a transmission. The SCI-1 and/or SCI-2 may be transmitted over the PSCCH.

Figures 5, 6:
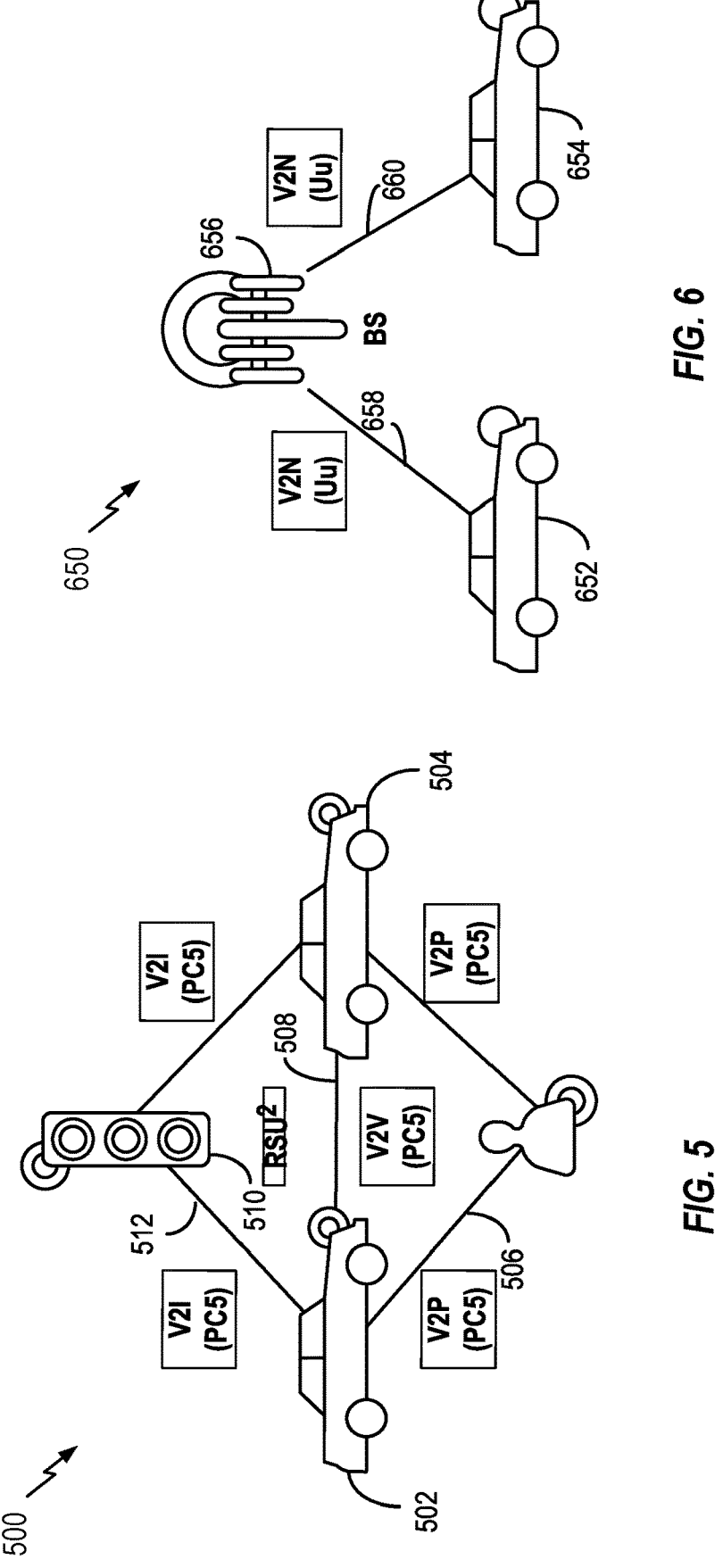
FIGS. 5 and 6 depict diagrammatic representations of example vehicle-to-everything (V2X) systems.

FIG. 5 and FIG. 6 show diagrammatic representations of example V2X systems. For example, vehicles shown in FIG. 5 and FIG. 6 communicate via sidelink channels and relay sidelink transmissions. V2X is a vehicular technology system that enables vehicles to communicate with traffic and an environment around them using short-range wireless signals, known as sidelink transmissions or signals.

The V2X systems shown in FIG. 5 and FIG. 6 provide two complementary transmission modes. A first transmission mode, shown by way of example in FIG. 5, involves direct communications (e.g., also referred to as sidelink communications) between participants in proximity to one another in a local area. A second transmission mode, shown by way of example in FIG. 6, involves network communications through a network entity, which may be implemented over a Uu interface (for example, a wireless communication interface between a radio access network (RAN) and a UE).

Referring to FIG. 5, a V2X system 500 (e.g., including V2V communications) is illustrated with two vehicles 502, 504. A first transmission mode allows for direct communication between different participants in a given geographic location. As illustrated, a vehicle 502 can have a wireless communication link 506 with an individual through a PC5 interface. Communications between the vehicles 502 and 504 may also occur through a PC5 interface 508. The communication may occur from the vehicle 502 to other highway components (e.g., a roadside unit (RSU) 510), such as a traffic signal or sign through a PC5 interface 512. With respect to each communication link illustrated in FIG. 5, two-way communication may take place between devices (such as the vehicles 502 and 504, the RSU 510), and therefore each device may be a transmitter and/or a receiver of information. The V2X system 500 is a self-managed system implemented without assistance from a network entity. The self-managed system may enable improved spectral efficiency, reduced cost, and increased reliability as network service interruptions do not occur during handover operations for moving the vehicles 502 and 504. The V2X system 500 is configured to operate in a licensed or unlicensed spectrum, and thus any of the vehicles 502 and 504 with an equipped system may access a common frequency and share information. Such harmonized/common spectrum operations allow for safe and reliable operation.

FIG. 6 shows a V2X system 650 for communication between a vehicle 652 and a vehicle 654 through a network entity 656 (e.g., a base station (BS)). Network communications may occur through discrete nodes, such as the network entity 656 that sends and receives information to and from (e.g., relays information between) the vehicles 652, 654. The network communications through vehicle to network (V2N) links 658 and 660 may be used, for example, for long-range communications between the vehicles 652, 654, such as for communicating the presence of a vehicle accident at a distance ahead along a road or highway. Other types of communications may be sent by a wireless node to the vehicles 652, 654, such as traffic flow conditions, road hazard warnings, environmental/weather reports, and service station availability, among other examples. Such data can be obtained from cloud-based sharing services.

Overview of Physical Sidelink Feedback Channel (PSFCH) Resources

Sidelink communications involve hybrid automatic repeat request (HARQ) feedback (e.g., acknowledgement (ACK) or negative ACK (NACK) information) processes for reliability purposes. For example, a first UE may receive a HARQ feedback for a sidelink transmission conveyed to a second UE in a physical sidelink shared channel (PSSCH). The sidelink transmission may be a unicast transmission intended for a single UE (e.g., the second UE) or a multicast or groupcast transmission intended for multiple receiving UEs.

A physical sidelink control channel (PSCCH) is used to indicate PSSCH resources used to carry the sidelink transmission. The HARQ feedback for the PSSCH is conveyed in a physical sidelink feedback channel (PSFCH). In some cases, the PSFCH is in a resource pool that includes the PSSCH that was used to convey the data associated with the HARQ feedback. That is, the PSFCH that includes the HARQ feedback is sent in the same resource pool as the PSSCH that conveyed the corresponding sidelink transmission.

Figure 7:
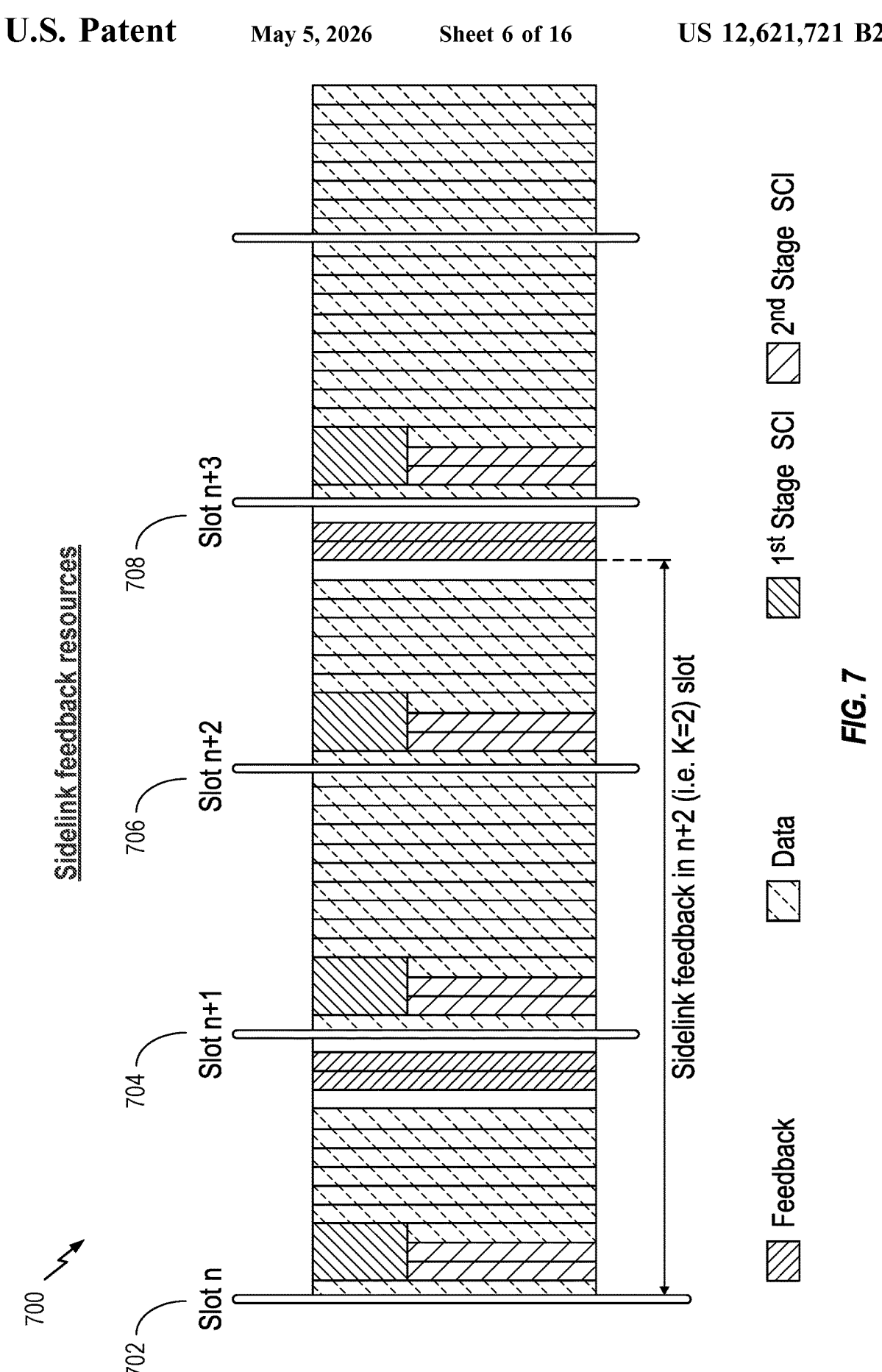
FIG. 7 depicts example sidelink feedback resources.

The PSFCH may occur periodically (e.g., within the resource pool configured for sidelink), and may include X number slots (e.g., 1, 2, or 4 slots) within a period N. For example, as illustrated in a diagram 700 of FIG. 7, the X number slots include a first slot (e.g., slot n 702), a second slot (e.g., slot n+1 704), a third slot (e.g., slot n+2 706), and a fourth slot (e.g., slot n+3 708).

Each PSFCH is mapped to a time, a frequency, and/or a code domain resource. When the PSFCH in a slot is in response to a single PSSCH, an implicit mechanism is used to determine the frequency and/or the code domain resource of the PSFCH within a configured resource pool. Parameters involved in the implicit mechanism may include a slot index associated with the PSCCH, the PSSCH, and/or the PSFCH; sub-channels associated with the PSSCH and/or the PSFCH; identifiers to distinguish each receiving UE in a group (e.g., for Option 2 groupcast HARQ feedback); layer-1 source ID; location information; sidelink signal-to-interference-plus-noise ratio (SINR); and/or sidelink reference signal received power (RSRP).

In some cases, when X number of slots are configured within the period N for the PSFCH, at least three orthogonal frequency division multiplexing (OFDM) symbols may be occupied (i.e., one gap+two PSFCH symbols). Also, in some cases, a number of physical resource blocks (PRBs) for the PSFCH are preconfigured.

In some cases, a PSFCH format 0 on one resource block (RB) carries HARQ-ACK information for a single PSSCH transmission. The PSFCH format 0 sequence may be repeated on at least two PSFCH symbols.

In some cases, the PSFCH is enabled for a unicast mode and a groupcast mode. The PSFCH for the unicast mode indicates one bit ACK/NACK. The PSFCH for the groupcast mode indicates two feedback modes. In one example, a receiver UE may only transmit HARQ-NACK information. In another example, the receiver UE may transmit the HARQ-ACK information or the HARQ-NACK information.

Figure 8A:
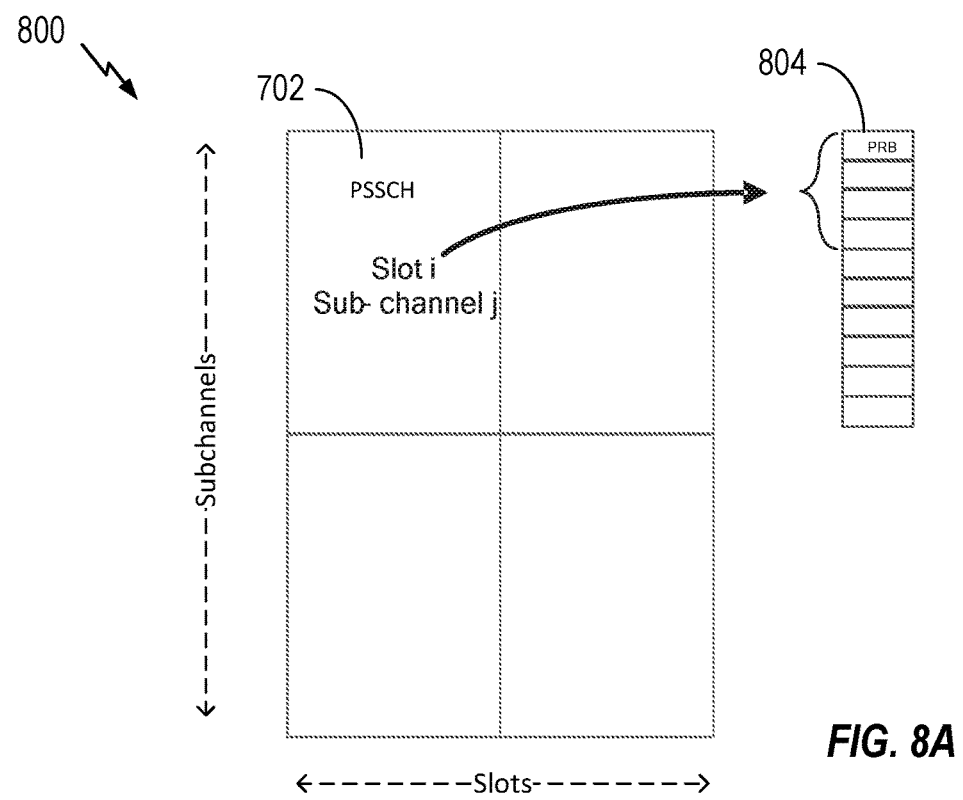
FIGS. 8A-8B depict examples of physical sidelink feedback shared channel (PSFCH) resource mapping.

FIG. 8A shows a diagram 800 depicting how resources of a common resource pool are allocated for sidelink communications (e.g., broadcast and groupcast device-to-device (D2D)) between UEs. The common resource pool includes slots and subchannels. The resources are allocated as combinations of the subchannels and the slots, and used for one or more PSSCH transmissions. In the diagram 800, a PSSCH 802 is allocated for one slot (slot i) and one sub-channel (j).

FIG. 8A also depicts how the PSSCH 802 is mapped to PSFCH resources 804. For example, there is a mapping between the PSSCH 802 and a corresponding PSFCH resource (e.g., within the PSFCH resources 804) based on a starting sub-channel of the PSSCH 802 (sl-PSFCH-CandidateResourceType is configured as startSubCH). The mapping is based on a number of subchannels in the PSSCH 802 (sl-PSFCH-CandidateResourceType is configured as allocSubCH), a slot containing the PSSCH 802, a source identification (ID), and/or a destination ID. In some cases, a number of available PSFCH resources (e.g., in the PSFCH resources 804) is based on (e.g., equal to or greater than) a number of UEs or UE pairs sharing the resource pool (e.g., the number of UEs in groupcast option 2).

Figure 8B:
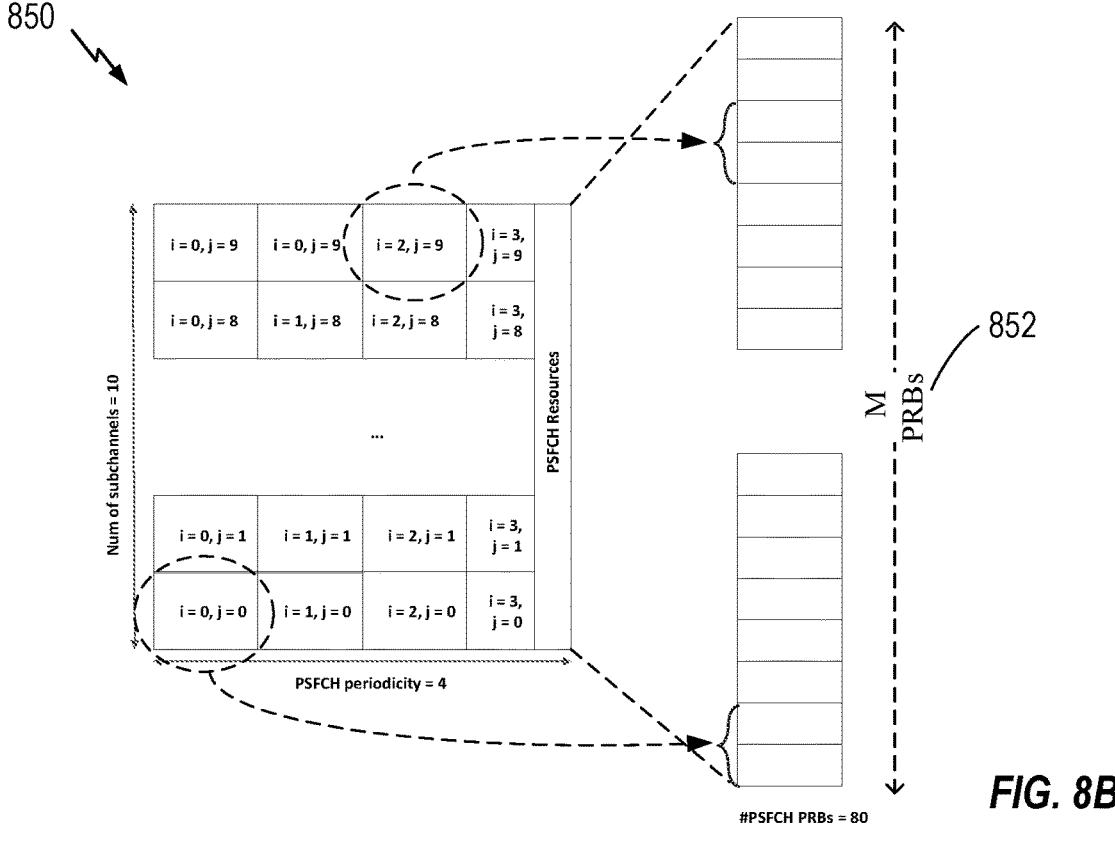

FIG. 8B shows a diagram 850 depicting PSFCH resource determination, based on a mapping of subchannels/slots (i, j). For example, a UE allocates physical resource blocks (PRBs) from $$M_{PRB,set}^{PSFCH}$$

PRBs 852 to slot i and sub-channel j of a resource pool (allocated for PSSCH transmissions), as follows:

$$\left[ \left(i + j \cdot N_{PSSCH}^{PSFCH}\right) \cdot M_{subch,slot}^{PSFCH}, \left(i + 1 + j \cdot N_{PSSCH}^{PSFCH}\right) \cdot M_{subch,slot}^{PSFCH} - 1 \right],$$

PRBs from $$M_{PRB,set}^{PSFCH}$$

PRBs 852 to slot i and sub-channel j, where i is between 0 and a PSFCH periodicity $$N_{PSSCH}^{PSFCH}$$

and j is between 0 and a total number of subchannels $$N_{subch}: 0 \le i \le N_{PSSCH}^{PSFCH} \text{ and } 0 \le j \le N_{subch}.$$

In the illustrated example, $$N_{PSSCH}^{PSFCH} = 4$$

and $$N_{subch} = 10,$$

and a total number of PRBs for PSFCH is 80, so a number of PSFCH PRBs per PSFCH is 2:

$$M_{subch,slot}^{PSFCH} = N_{PSFCH\_PRBs}/\left(N_{PSSCH}^{PSFCH} * N_{subch}\right) = 80/(4*10) = 2.$$

In other words, in this example, each PSSCH slot/sub-channel is associated with two PSFCH PRBs (though PSFCH may be only sent on one of the PSFCH PRBs).

Overview of Long Term Evolution (LTE) Vehicle-to-Everything (V2X)-New Radio (NR) V2X Channel Co-Existence In some cases, user equipment (UEs) operating on a first radio access technology (RAT) (e.g., long term evolution (LTE) vehicle-to-everything (V2X) UEs) and UEs operating on a second RAT (e.g., new radio (NR) V2X UEs) may exist and operate on overlapping frequency resources (e.g., in a same channel), and over a period of time, only the NR V2X UEs may exist in the channel. FIGS. 9-12 depict this transition from existence of the LTE V2X UEs and the NR V2X UEs in the same channel to only the NR V2X UEs in the channel.

Figure 9:
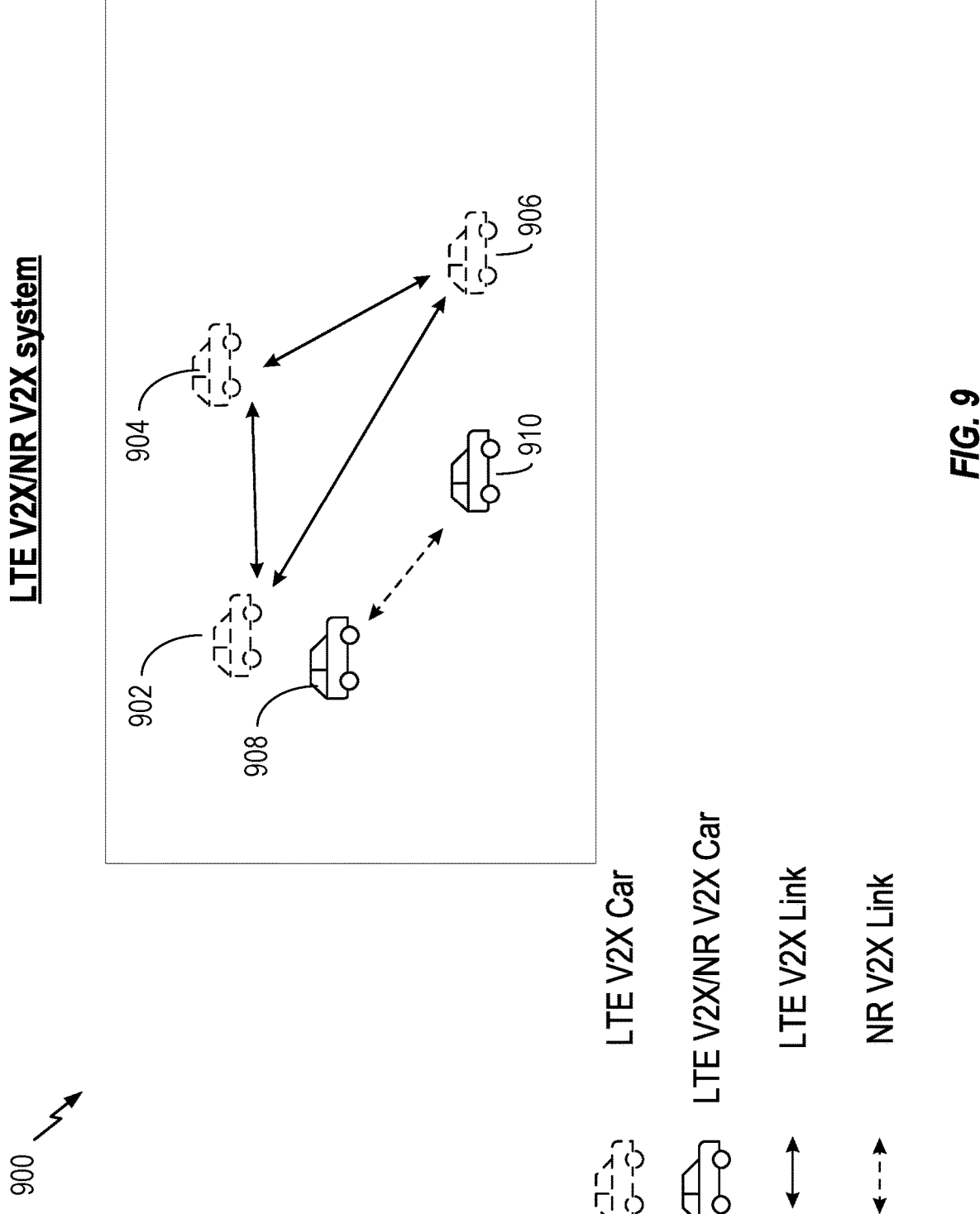
FIG. 9 depicts example long term evolution (LTE) V2X-new radio (NR) V2X system.

FIG. 9 depicts example LTE V2X-NR V2X system 900. In the system 900, LTE and NR V2X UEs exists and operate in a same channel. The system 900 includes a first UE 902, a second UE 904, a third UE 906, a fourth UE 908, and a fifth UE 910.

The first UE 902, the second UE 904, and the third UE 906 are UEs, which may use or implement an LTE radio access technology (RAT). Communications between the first UE 902, the second UE 904, and the third UE 906 may occur through an LTE V2X based wireless communication link.

The fourth UE 908 and the fifth UE are UEs, which may use or implement a NR RAT and the LTE RAT. Communications between the fourth UE 908 and the fifth UE may occur through a NR V2X based wireless communication link.

In the system 900, there are a higher number of LTE V2X UEs than NR V2X UEs (or NR-LTE V2X UEs). Also, an overall spectrum available to the UEs in the system 900 may be under utilized, and in some cases, the fourth UE 908 and the fifth UE may use the remaining un-utilized spectrum for advanced applications.

Figure 10:
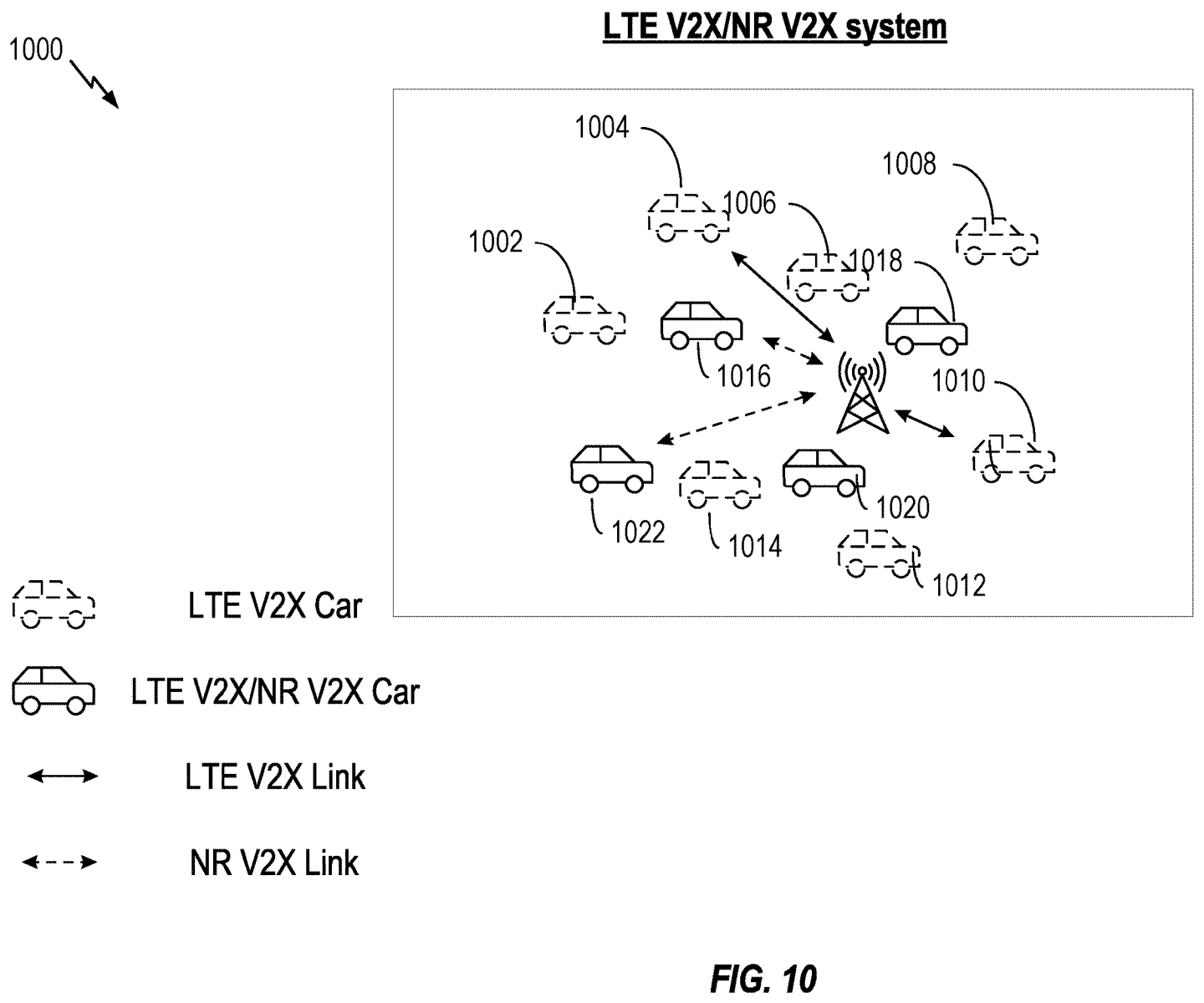

FIG. 10 depicts another example LTE V2X-NR V2X system 1000. In the system 1000, LTE and NR V2X UEs exists and operate in a same channel. The system 1000 includes a first UE 1002, a second UE 1004, a third UE 1006, a fourth UE 1008, a fifth UE 1010, a sixth UE 1012, a seventh UE 1014, an eighth UE 1016, a ninth UE 1018, a tenth UE 1020, and an eleventh UE 1022.

The first UE 1002, the second UE 1004, the third UE 1006, the fourth UE 1008, the fifth UE 1010, the sixth UE 1012, and the seventh UE 1014 are UEs, which may use or implement an LTE RAT. Communications between the first UE 1002, the second UE 1004, the third UE 1006, the fourth UE 1008, the fifth UE 1010, the sixth UE 1012, and/or the seventh UE 1014 may occur through an LTE V2X based wireless communication link.

The eighth UE 1016, the ninth UE 1018, the tenth UE 1020, and the eleventh UE 1022 are UEs, which may use or implement an NR RAT and the LTE RAT. Communications between the eighth UE 1016, the ninth UE 1018, the tenth UE 1020, and/or the eleventh UE 1022, may occur through an NR V2X based wireless communication link.

In the system 1000, there is a similar number of LTE V2X UEs and NR V2X UEs (or NR-LTE V2X UEs). In this system 1000, some V2X applications may be re-routed to the ninth UE 1018, the tenth UE 1020, and the eleventh UE 1022 (e.g., from the first UE 1002, the second UE 1004, the third UE 1006, the fourth UE 1008, the fifth UE 1010, the sixth UE 1012, and/or the seventh UE 1014) for better utilization of an overall spectrum available to the UEs.

FIG. 11 depicts a diagram 1100 of NR V2X system and example LTE V2X-NR V2X system. These systems include a first UE 1102, a second UE 1104, a third UE 1106, a fourth UE 1108, a fifth UE 1110, a sixth UE 1112, a seventh UE 1114, an eighth UE 1116, a ninth UE 1118, a tenth UE 1120, an eleventh UE 1122, a twelfth UE 1124, a thirteenth UE 1126, a fourteenth UE 1128, and a fifteenth UE 1130.

The first UE 1102 and the second UE 1104 are UEs, which may use or implement an LTE RAT.

The third UE 1106, the fourth UE 1108, the fifth UE 1110, the sixth UE 1112, the seventh UE 1114, the eighth UE 1116, the ninth UE 1118, the tenth UE 1120, the eleventh UE 1122, the twelfth UE 1124, the thirteenth UE 1126, the fourteenth UE 1128, and the fifteenth UE 1130 are UEs, which may use or implement an NR RAT and the LTE RAT.

As depicted in the diagram 1100, LTE V2X UEs may start to expire over a period of time and NR V2X UEs (or NR-LTE V2X UEs) may operate all applications and provide a higher quality of service. Accordingly, although there may be some LTE V2X UEs, however, a majority of UEs are the NR V2X UEs which may operate as if they are the only UEs in a channel of the LTE V2X UEs and the NR V2X UEs.

FIG. 12 depicts example NR V2X system 1200. The NR V2X system 1200 include multiple UEs operating in a channel. The multiple UEs include a first UE 1202, a second UE 1204, a third UE 1206, a fourth UE 1208, a fifth UE 1210, a sixth UE 1212, a seventh UE 1214, an eighth UE 1216, and a ninth UE 1218.

The first UE 1202, the second UE 1204, the third UE 1206, the fourth UE 1208, the fifth UE 1210, the sixth UE 1212, the seventh UE 1214, the eighth UE 1216, and the ninth UE 1218 are UEs, which may use or implement an NR RAT and an LTE RAT. In the system 1200, there are no LTE V2X UEs, and all NR V2X UEs (or NR-LTE V2X UEs) may operate as if they are the only UEs in the channel.

Figure 13:
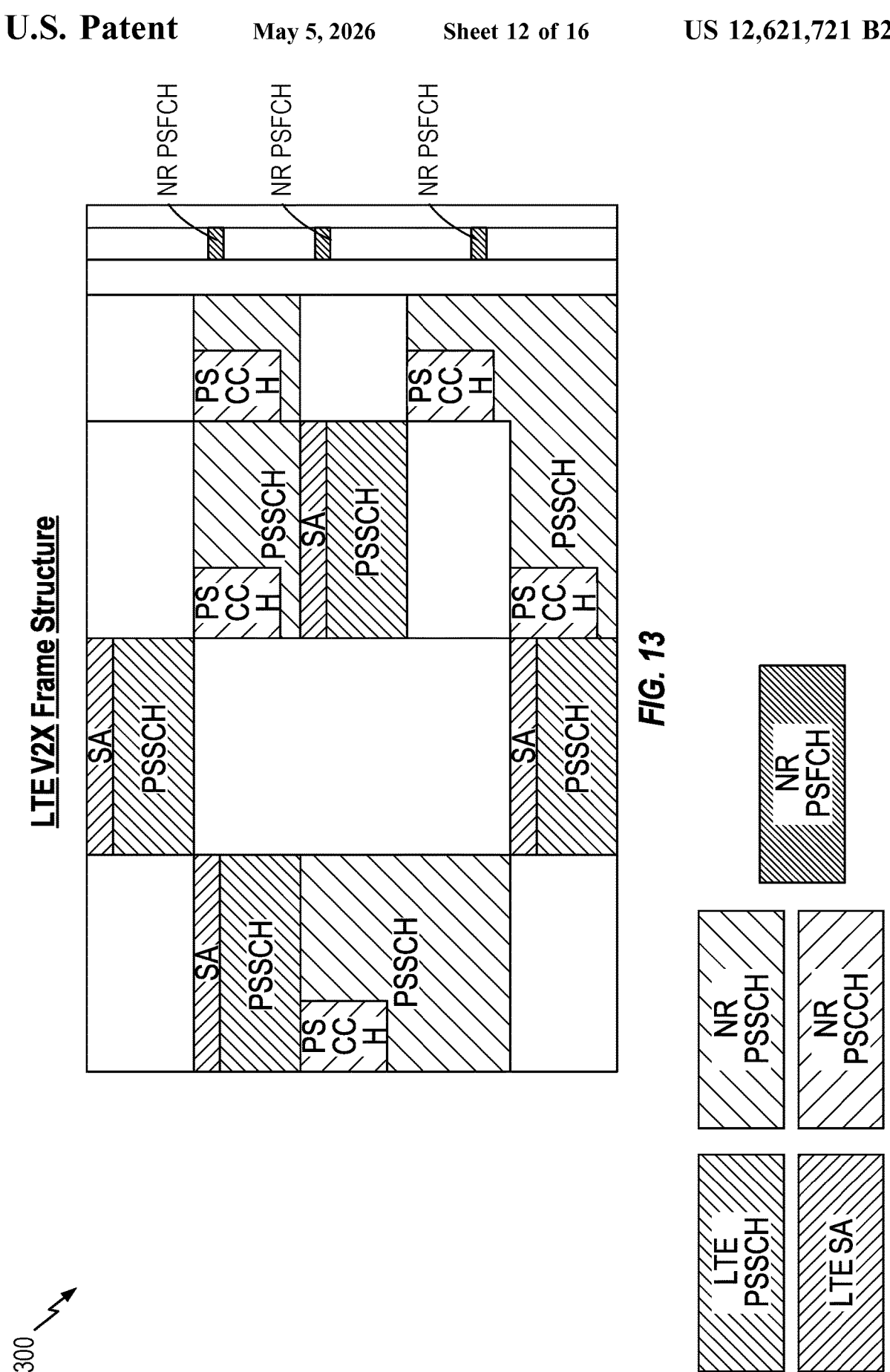
FIG. 13 depicts example LTE V2X frame structure.
Figure 14:
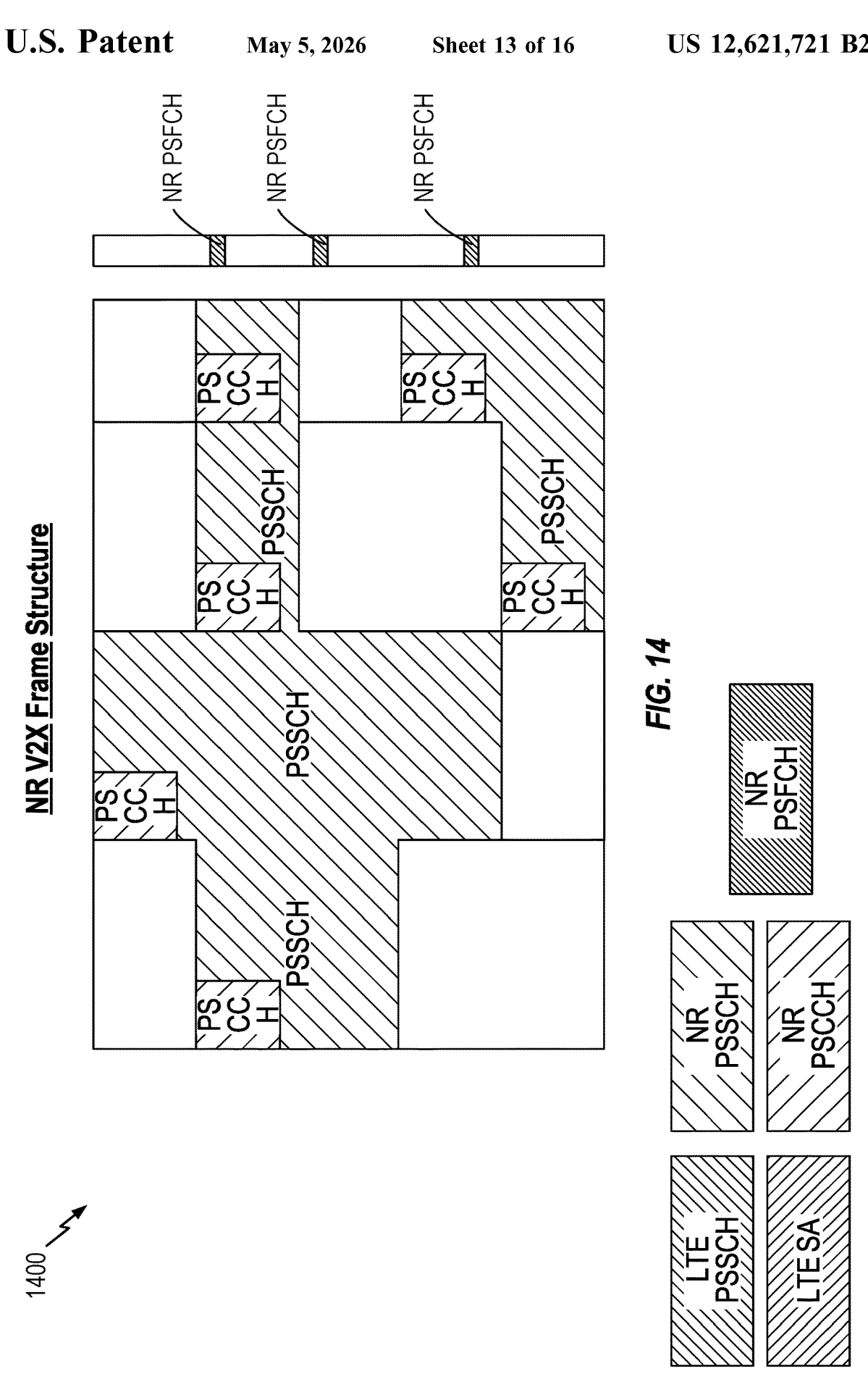
FIG. 14 depicts example NR V2X frame structure.

Since the LTE V2X UEs and the NR V2X UEs may operate in the same channel, in some cases, LTE V2X transmissions and NR V2X transmissions may collide (e.g., as depicted in a diagram 1300 of FIG. 13 and a diagram 1400 of FIG. 14) when there is no coordination between the LTE V2X UEs and the NR V2X UEs for resource selection. For example, there may be a physical sidelink control channel (PSCCH)/physical sidelink shared channel (PSSCH) collision between the LTE RAT and the NR RAT. In another example, an NR physical sidelink feedback channel (PSFCH) may collide with an LTE PSSCH/PSCCH (e.g., since the NR V2X UEs may have no control over PSFCH resource selection).

In some cases, an NR V2X UE may transmit an NR PSCCH/PSSCH, which may require a feedback based retransmission. In such cases, another NR V2X UE (which receives the NR PSCCH/PSSCH) transmits a PSFCH signal (e.g., in response to the received NR PSCCH/PSSCH) in a corresponding PSFCH slot, which may be located later than an NR PSSCH transmission slot.

In some cases, the NR V2X UEs may avoid selecting resources in a resource pool for PSCCH/PSSCH transmissions where a corresponding PSFCH transmission occasions may overlap with the LTE V2X UEs reservations in a time domain. As a result, other NR V2X UEs may not need to transmit a PSFCH transmission on the resources/NR PSFCH slots overlapping with the LTE V2X UEs reservations in the time domain, in response to the transmitted PSCCH/ PSSCHs.

Since each NR PSFCH slot may be associated with four NR PSCCH/PSSCH slots, a single LTE V2X reservation may prevent the NR V2X UEs to select PSCCH/PSSCH resources in four slots, since the NR V2X UEs has to avoid selecting resources in the resource pool for the PSCCH/ PSSCH transmissions where the corresponding PSFCH transmission occasions may overlap with the LTE V2X UEs reservations in the time domain. This may severely limit the possible choice of the resources for the NR V2X UEs for NR V2X transmissions and may cause an increase in resources collision among the NR V2X transmissions.

Aspects Related to Managing Feedback-Based Transmission in Multi-RAT Scenarios with a Same Channel Co-Existence To prevent exclusion of a high number of resources for new radio (NR) vehicle-to-everything (V2X) transmissions due to long term evolution (LTE) sidelink resource reservations during an NR V2X-LTE V2X channel co-existence, aspects of the present disclosure provide apparatuses, methods, processing systems, and computer-readable mediums for managing (e.g., disabling) sidelink feedback-based transmissions under some specific conditions. For example, an NR V2X user equipment (UE) may disable a requesting feedback (e.g., a request for a feedback) for physical sidelink control channel (PSCCH)/physical sidelink shared channel (PSSCH) transmissions, when the NR V2X UE detects at least N number of the LTE sidelink resource reservations.

Particular aspects of the subject matter described in this disclosure can be implemented to realize one or more of the following potential advantages. In some examples, the described techniques can be used to enhance co-existence between LTE V2X transmissions and the NR V2X transmissions within the same channel, provide flexibility in scheduling, and make more efficient use of resources.

Figure 15:
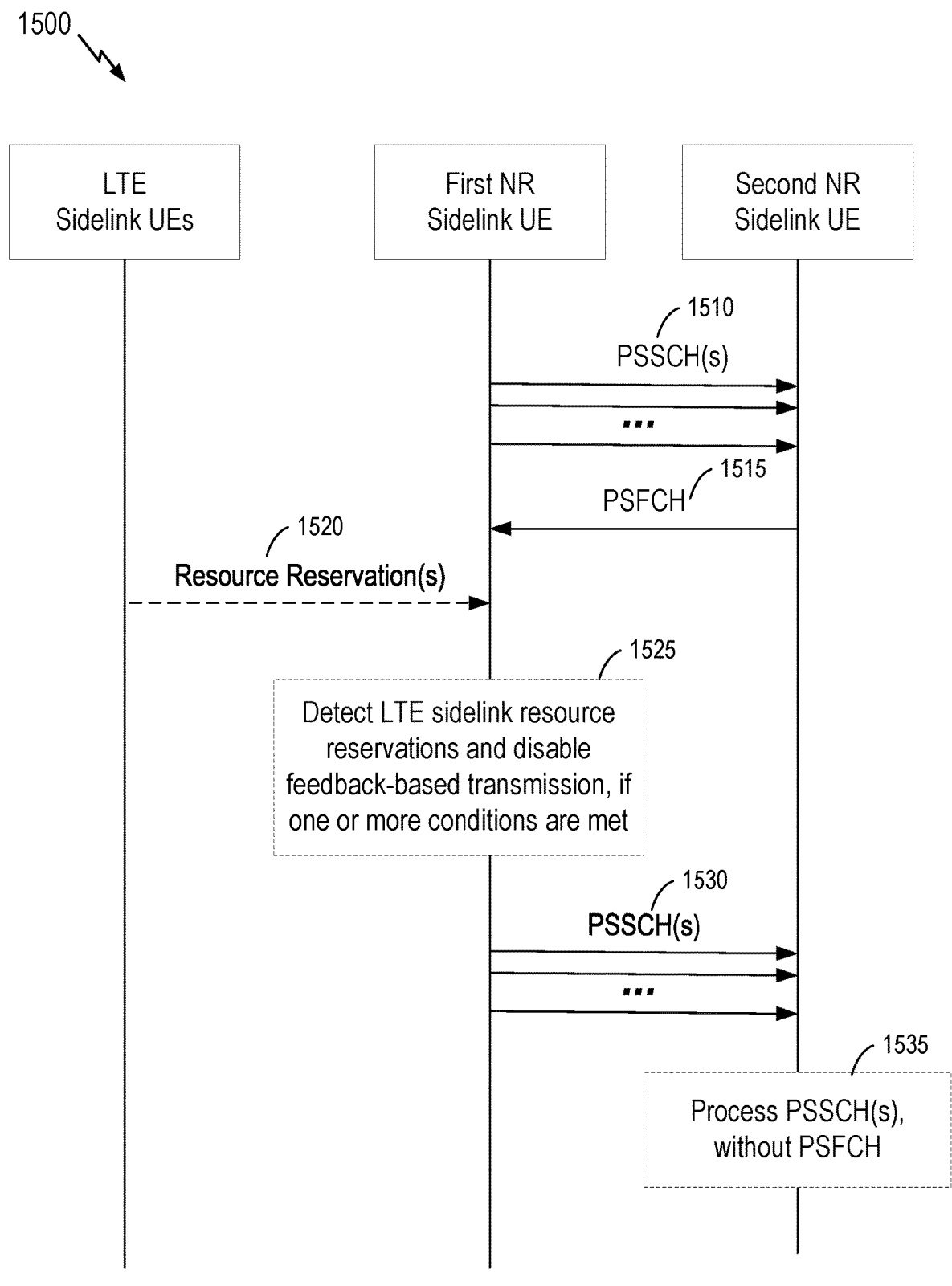
FIG. 15 depicts a call flow diagram illustrating example communication among multiple UEs.
Figure 17:
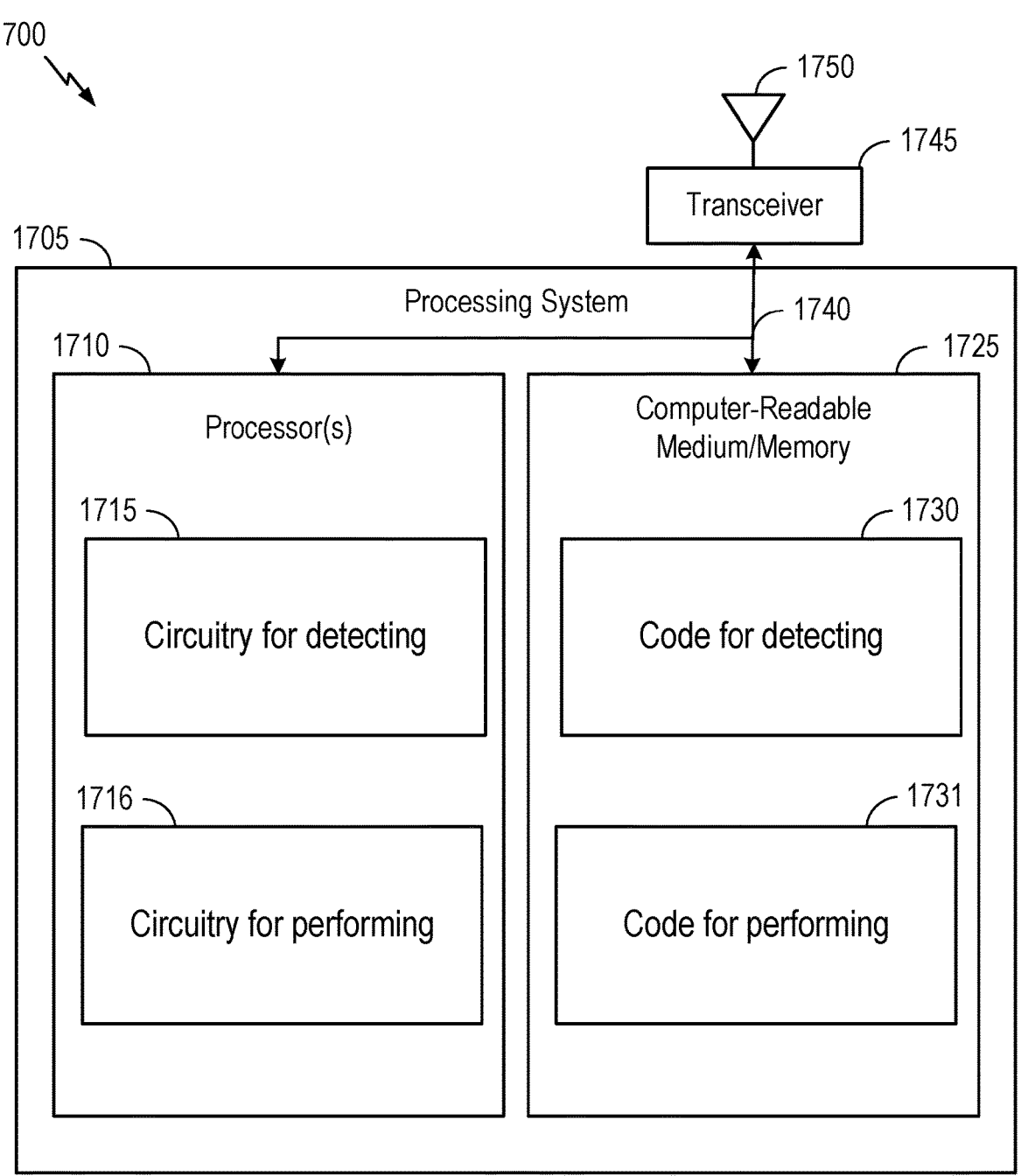
FIG. 17 depicts aspects of example communications device.

The techniques proposed herein may be understood with reference to FIGS. 15-17.

FIG. 15 depicts a call flow diagram 1500 illustrating example communication among multiple UEs (e.g., such as the UE 104 depicted and described with respect to FIGS. 1 and 3). The multiple UEs include a first NR sidelink UE, a second NR sidelink UE, and LTE sidelink UEs. The first NR sidelink UE and the second NR sidelink UE may use or implement an NR radio access technology (RAT). The LTE sidelink UEs may use or implement an LTE RAT.

At 1510, the first NR sidelink UE sends one or more physical sidelink shared channel transport blocks (PSSCH TBs) to the second NR sidelink UE. For example, one or more NR sidelink transmissions (e.g., PSCCH/PSSCH transmissions) are conveyed by the first NR sidelink UE to the second NR sidelink UE in the one or more PSSCH TBs.

At 1515, the second NR sidelink UE sends at least one physical sidelink feedback channel (PSFCH) to the first NR sidelink UE, in response to the one or more PSCCH/PSSCH transmissions received from the first NR sidelink UE. For example, a hybrid automatic repeat request (HARQ) feedback (e.g., acknowledgement (ACK) or negative ACK (NACK) information) for the one or more PSCCH/PSSCH transmissions is conveyed in the at least one PSFCH.

At 1520, the first NR sidelink UE receives (e.g., directly or indirectly) an indication of a resource reservation from one or more LTE sidelink UEs. In one example, the first NR sidelink UE may receive the indication of the resource reservation from the one or more LTE sidelink UEs (e.g., without via a network entity). In another example, the first NR sidelink UE may receive the indication of the resource reservation from the network entity.

In certain aspects, the resource reservation may indicate one or more reservations of one or more LTE sidelink resources (e.g., from a set of resources) for one or more LTE sidelink transmissions. The one or more LTE sidelink resources may include resources overlapping with one or more PSFCHs slots configured for one or more PSFCHs.

At 1525, the first NR sidelink UE detects LTE sidelink resource reservations (e.g., in the set of resources) based on the received indication. The first NR sidelink UE disables a requesting feedback (e.g., a request for a feedback) for PSCCH/PSSCH transmissions, if one or more conditions (e.g., corresponding to the LTE sidelink resource reservations) are met.

At 1530, the first NR sidelink UE again sends the one or more PSCCH/PSSCH transmissions to the second NR sidelink UE (e.g., after disabling the requesting feedback for the PSCCH/PSSCH transmissions).

At 1535, the second NR sidelink UE processes the one or more PSCCH/PSSCH transmissions, without sending the one or more PSFCHs to the first NR sidelink UE, in response to the one or more PSCCH/PSSCH transmissions received from the first NR sidelink UE.

In certain aspects, the first NR sidelink UE may disable the requesting feedback for the PSCCH/PSSCH transmissions, when the first NR sidelink UE detects at least one LTE sidelink resource reservation. That is, the first NR sidelink UE may request a feedback for the PSCCH/PSSCH transmissions only when a spectrum is clear from the one or more LTE sidelink UEs.

In certain aspects, the first NR sidelink UE calculates a number of resources (e.g., of the set of resources) within a resource selection window that can not be selected by the first NR sidelink UE (e.g., for one or more sidelink transmissions) due to the LTE sidelink resource reservations. The resource selection window includes multiple resources in the one or more PSFCH slots and other slots configured for the NR sidelink transmissions. Each resource in the resource selection window may be associated with a PSFCH slot. The one or more NR sidelink transmissions may include one or more NR PSCCHs and/or one or more NR PSSCHs.

For example, the first NR sidelink UE may calculate a ratio of resources or the number of resources within the resource selection window that are excluded for the first NR sidelink UE due to the LTE sidelink resource reservations overlapping with the associated PSFCH slot.

In one aspect, the first NR sidelink UE calculates the number of resources, based on counting a number of PSFCH slots that overlaps with the LTE sidelink resource reservations. For example, the first NR sidelink UE may calculate the PSFCH slots that overlaps with the at least one LTE sidelink resource reservation.

In another aspect, the first NR sidelink UE calculates the number of resources, based on counting the number of resources that can not be selected by the first NR sidelink UE. For example, the first NR sidelink UE may calculate the number of resources by directly counting excluded resources for the first NR sidelink UE due to the LTE sidelink resource reservations.

In another aspect, the first NR sidelink UE calculates the number of resources, based on counting a subset of resources in the set of resources from which a higher layer selects resources for the one or more NR sidelink transmissions.

In certain aspects, the first NR sidelink UE determines that the one or more conditions are met when a value of the calculated number of resources exceeds a threshold value. In such cases, the first NR sidelink UE disables the requesting feedback for its PSCCH/PSSCH transmissions. For example, if the ratio of resources or the number of resources within the resource selection window that is excluded due to the LTE sidelink resource reservations overlapping with the associated PSFCH slots exceed the threshold value and a current sidelink transmission requires a feedback, the first NR sidelink UE disables the requesting feedback for that PSCCH/PSSCH transmission (e.g., at least in a current transport block (TB)).

In one aspect, the first NR sidelink UE may disable the requesting feedback for the PSCCH/PSSCH transmissions, based on changing a cast type. For example, the first NR sidelink UE may change the cast type of the sidelink transmission (to other NR sidelink UEs) to broadcast to disable the requesting feedback.

In another aspect, the first NR sidelink UE may disable the requesting feedback for the PSCCH/PSSCH transmissions, based on adjusting a status of a flag. For example, the first NR sidelink UE may set the feedback required flag to false (e.g., via a sidelink control information (SCI)) to disable the requesting feedback.

In certain aspects, the first NR sidelink UE receives a configuration indicating one or more threshold values (e.g., to compare with the value of the calculated number of resources).

In one example, the first NR sidelink UE may select a first threshold value of the one or more threshold values (e.g., to compare with the value of the calculated number of resources), based on a first reservation status of the set of resources including the one or more LTE sidelink resources. The first reservation status may indicate that a number of the LTE sidelink resource reservations are lower than a reference number N.

In another example, the first NR sidelink UE may select a second threshold value of the one or more threshold values (e.g., to compare with the value of the calculated number of resources), based on a second reservation status of the set of resources including the one or more LTE sidelink resources. The second reservation status may indicate that the number of the LTE sidelink resource reservations are higher than the N.

In certain aspects, the first NR sidelink UE determines a priority value associated with the one or more PSCCH/PSSCH transmissions. The first NR sidelink UE may continue the requesting feedback for the PSCCH/PSSCH transmissions, when the determined priority value is higher than a threshold value. For example, the first NR sidelink UE may determine that a PSCCH/PSSCH TB with a higher priority may need feedbacks and a large number of PSCCH/PSSCH retransmissions (if needed based on the feedbacks). In such cases, the priority constrain may ensure that a limited number remaining resources within the set of resources are not congested and are available.

In certain aspects, the first NR sidelink UE may determine that the LTE sidelink resource reservations are for another adjacent UE (e.g., the second NR sidelink UE), based on a current reservation status of the set of resources.

The first NR sidelink UE sends a first signaling to the second NR sidelink UE, in response to the determination that the LTE sidelink resource reservations are for the second NR sidelink UE. In one example, the first signaling may indicate the second NR sidelink UE to disable the requesting feedback for the PSCCH/PSSCH transmissions. In another example, the first signaling may indicate to request feedbacks for the PSCCH/PSSCH transmissions at least when the priority value associated with the one or more PSCCH/PSSCH transmissions is higher than the threshold value. When the priority is lower than or equal to the threshold value, the feedback for the PSCCH/PSSCH transmissions is not requested. In one example, the first signaling is a medium access control (MAC) control element (CE) message. In another example, the first signaling is a radio resource control (RRC) message (such as a PC5 RRC message).

In certain aspects, the first NR sidelink UE may determine to transmit the MAC CE or the RRC message to the second NR sidelink UE to disable the requesting feedback for the PSCCH/PSSCH transmissions, based on a presence of at least one LTE sidelink resource reservation in a channel.

In certain aspects, the first NR sidelink UE may determine to transmit the MAC CE or the RRC message to the second NR sidelink UE to disable the requesting feedback for the PSCCH/PSSCH transmissions, when a number of the LTE sidelink resource reservations received with a reference signal receive power (RSRP) value exceeds a threshold value.

In certain aspects, the first NR sidelink UE may detect a change in the current reservation status of the set of resources. The first NR sidelink UE sends a second signaling to the second NR sidelink UE, in response to the determination of the change in the current reservation status of the set of resources. The second signaling may enable the requesting feedback for the PSCCH/PSSCH transmissions. For example, the first NR sidelink UE may subsequently send a second MAC CE or a second RRC message enabling the requesting feedback for the PSCCH/PSSCH transmissions, based on a change in LTE traffic/reservation information in the set of resources (e.g., moving from a region with a high LTE traffic/reservation to another with a low LTE traffic/reservation).

Example Method for Wireless Communications by a First User Equipment (UE)

FIG. 16 shows an example of a method 1600 for wireless communications at a first user equipment (UE), such as the UE 104 of FIGS. 1 and 3.

Method 1600 begins at step 1610 with detecting at least one condition related to first resources reserved for sidelink transmissions in a first radio access technology (RAT). In some cases, the operations of this step refer to, or may be performed by, circuitry for detecting and/or code for detecting as described with reference to FIG. 17.

Method 1600 then proceeds to step 1620 with performing one or more actions, based on the detection, to limit feedback request for sidelink transmissions in a second RAT. In some cases, the operations of this step refer to, or may be performed by, circuitry for performing and/or code for performing as described with reference to FIG. 17.

In certain aspects, the first resources include resources that are associated with a physical sidelink feedback channel (PSFCH) slot.

In certain aspects, the first RAT corresponds to a long term evolution (LTE) RAT.

In certain aspects, the second RAT corresponds to a new radio (NR) RAT.

In certain aspects, the at least one condition relates to an amount of resources from a candidate set of resources within a resource selection window that are excluded, for the sidelink transmissions in the second RAT, due to reservation of the first resources overlapping with the associated PSFCH slots; and/or detection of one or more reservations of the first resources for the sidelink transmissions in the first RAT.

In certain aspects, the method 1600 further includes calculating the amount of resources excluded from the candidate set of resources. In certain aspects, the amount of resources are calculated based on counting a number of PSFCH slots overlapping with at least one of the first resources reserved for the sidelink transmissions in the first RAT, a number of resources from the candidate set of resources that can not be selected by the first UE due to reservation of the first resources overlapping with the associated PSFCH slot, and/or a subset of resources in the candidate set of resources from which a higher layer selects resources for one or more transmissions.

In certain aspects, the one or more actions include: disabling the requesting feedback for at least one sidelink transmission in the second RAT when the amount of resources excluded from the candidate set of resources or a number of the one or more reservations of the first resources for the sidelink transmissions in the first RAT detected exceeds a threshold value.

In certain aspects, the disabling the requesting feedback for the at least one sidelink transmission in the second RAT includes changing a cast type associated with the at least one sidelink transmission, and/or adjusting a status of a flag associated with the at least one sidelink transmission.

In certain aspects, the method 1600 further includes receiving signaling indicating the threshold value. In certain aspects, the threshold value is one of a plurality of different threshold values corresponding to different priorities.

In certain aspects, the one or more actions include: deciding whether to disable the requesting feedback for at least sidelink transmission in the second RAT when the at least one condition is met, based on a priority associated with the at least sidelink transmission.

In certain aspects, the method 1600 further includes disabling the requesting feedback, based on the priority associated with the at least sidelink transmission.

In certain aspects, the at least one condition indicates that the first resources are for a second UE, based on a current reservation status of a candidate set of resources; and the one or more actions include transmitting a first signaling to the second UE, in response to the detection of the at least one condition.

In certain aspects, the first signaling includes an indication to disable the requesting feedback for at least one sidelink transmission in the second RAT, and/or an indication to enable the requesting feedback for the at least one sidelink transmission in the second RAT.

In certain aspects, the detecting further includes detecting a change in the current reservation status of the candidate set of resources; the one or more actions include transmitting a second signaling to the second UE, in response to the detection of the change in the current reservation status of the candidate set of resources; and the second signaling includes an indication to enable the requesting feedback for at least one sidelink transmission in the second RAT.

In certain aspects, the at least one condition relates to an indication from a second UE that the first resources are reserved for the sidelink transmissions in the first RAT; and the one or more actions include disabling the requesting feedback for at least one sidelink transmission in the second RAT in accordance with the indication.

In certain aspects, the indication is based on a value of a number of the first resources within a period.

In certain aspects, the indication is based on a value of a reference signal receive power (RSRP) associated with a number of the first resources within a period.

In one aspect, the method 1600, or any aspect related to it, may be performed by an apparatus, such as a communications device 1700 of FIG. 17, which includes various components operable, configured, or adapted to perform the method 1600. The communications device 1700 is described below in further detail.

Note that FIG. 16 is just one example of a method, and other methods including fewer, additional, or alternative steps are possible consistent with this disclosure.

Example Communications Device

FIG. 17 depicts aspects of an example communications device 1700. In some aspects, communications device 1700 is a first user equipment (UE), such as UE 104 described above with respect to FIGS. 1 and 3.

The communications device 1700 includes a processing system 1705 coupled to a transceiver 1745 (e.g., a transmitter and/or a receiver). The transceiver 1745 is configured to transmit and receive signals for the communications device 1700 via an antenna 1750, such as the various signals as described herein. The processing system 1705 may be configured to perform processing functions for the communications device 1700, including processing signals received and/or to be transmitted by the communications device 1700.

The processing system 1705 includes one or more processors 1710. In various aspects, the one or more processors 1710 may be representative of one or more of receive processor 358, transmit processor 364, TX MIMO processor 366, and/or controller/processor 380, as described with respect to FIG. 3. The one or more processors 1710 are coupled to a computer-readable medium/memory 1725 via a bus 1740. In certain aspects, the computer-readable medium/memory 1725 is configured to store instructions (e.g., computer-executable code) that when executed by the one or more processors 1710, cause the one or more processors 1710 to perform the method 1600 described with respect to FIG. 16. Note that reference to a processor performing a function of communications device 1700 may include one or more processors 1710 performing that function of communications device 1700.

In the depicted example, computer-readable medium/memory 1725 stores code (e.g., executable instructions), such as code for detecting 1730 and code for performing 1731. Processing of the code for detecting 1730 and the code for performing 1731 may cause the communications device 1700 to perform the method 1600 described with respect to FIG. 16.

The one or more processors 1710 include circuitry configured to implement (e.g., execute) the code stored in the computer-readable medium/memory 1725, including circuitry such as circuitry for detecting 1715 and circuitry for performing 1716. Processing with the circuitry for detecting 1715 and the circuitry for performing 1716 may cause the communications device 1700 to perform the method 1600 described with respect to FIG. 16.

Various components of the communications device 1700 may provide means for performing the method 1600 described with respect to FIG. 16 and/or any aspect related to it. For example, means for transmitting, sending or outputting for transmission may include transceivers 354 and/or antenna(s) 352 of the UE 104 illustrated in FIG. 3. Means for receiving or obtaining may include transceivers 354 and/or antenna(s) 352 of the UE 104 illustrated in FIG. 3.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. In various aspects, an RF front end may include various components, including transmit and receive processors, transmit and receive MIMO processors, modulators, demodulators, and the like, such as depicted in the examples in FIG. 3.

In some cases, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 3. Notably, FIG. 17 is an example, and many other examples and configurations of communication device 1700 are possible.

Example Clauses

Implementation examples are described in the following numbered clauses:

Clause 1: A method for wireless communications at a first user equipment (UE), comprising: detecting at least one condition related to first resources reserved for sidelink transmissions in a first radio access technology (RAT); and performing one or more actions, based on the detection, to limit feedback request for sidelink transmissions in a second RAT.

Clause 2: The method of clause 1, wherein the first resources comprise resources overlapping with a physical sidelink feedback channel (PSFCH) slot.

Clause 3: The method of any one of clauses 1-2, wherein: the first RAT corresponds to a long term evolution (LTE) RAT; and the second RAT corresponds to a new radio (NR) RAT.

Clause 4: The method of any one of clauses 1-3, wherein the at least one condition relates to at least one of: an amount of resources from a candidate set of resources within a resource selection window that are excluded, for the sidelink transmissions in the second RAT, due to reservation of the first resources where the reservation overlaps with a physical sidelink feedback channel (PSFCH) slot associated with a resource; or detection of one or more reservations of the first resources for the sidelink transmissions in the first RAT.

Clause 5: The method of clause 4, further comprising calculating the amount of resources excluded from the candidate set of resources.

Clause 6: The method of clause 5, wherein the amount of resources are calculated based on counting at least one of: a number of PSFCH slots comprising at least one of the first resources reserved for the sidelink transmissions in the first RAT; a number of resources from the candidate set of resources that can not be selected by the first UE due to reservation of the first resources where the reservation overlaps with the PSFCH slot associated with the resource; or a subset of resources in the candidate set of resources from which a higher layer selects resources for one or more transmissions.

Clause 7: The method of clause 4, wherein the one or more actions comprise: disabling the feedback request for at least one sidelink transmission in the second RAT when the amount of resources excluded from the candidate set of resources or a number of the one or more reservations of the first resources for the sidelink transmissions in the first RAT detected exceeds a threshold value.

Clause 8: The method of clause 7, wherein the disabling comprises at least one of: changing a cast type associated with the at least one sidelink transmission; or adjusting a status of a flag associated with the at least one sidelink transmission.

Clause 9: The method of clause 7, further comprising receiving signaling indicating the threshold value.

Clause 10: The method of clause 9, wherein the threshold value is one of a plurality of different threshold values corresponding to different priorities.

Clause 11: The method of any one of clauses 1-10, wherein the one or more actions comprise: deciding whether to disable the feedback request for at least sidelink transmission in the second RAT when the at least one condition is met, based on a priority associated with the at least sidelink transmission.

Clause 12: The method of clause 11, further comprising disabling the feedback request, based on the priority.

Clause 13: The method of any one of clauses 1-12, wherein: the at least one condition indicates that the first resources are for a second UE, based on a current reservation status of a candidate set of resources; and the one or more actions comprise transmitting a first signaling to the second UE, in response to the detection of the at least one condition.

Clause 14: The method of clause 13, wherein the first signaling comprises at least one of: an indication to disable the feedback request for at least one sidelink transmission in the second RAT; or an indication to transmit at least one feedback for the at least one sidelink transmission in the second RAT.

Clause 15: The method of clause 13, wherein: the detecting further comprising detecting a change in the current reservation status of the candidate set of resources; the one or more actions comprise transmitting a second signaling to the second UE, in response to the detection of the change in the current reservation status of the candidate set of resources; and the second signaling comprises an indication to enable the feedback request for at least one sidelink transmission in the second RAT.

Clause 16: The method of any one of clauses 1-15, wherein: the at least one condition relates to an indication from a second UE that the first resources are reserved for the sidelink transmissions in the first RAT; and the one or more actions comprise disabling the feedback request for at least one sidelink transmission in the second RAT in accordance with the indication.

Clause 17: The method of clause 16, wherein the indication is based on a value of a number of the first resources within a period.

Clause 18: The method of clause 16, wherein the indication is based on a value of a reference signal receive power (RSRP) associated with a number of the first resources within a period.

Clause 19: An apparatus, comprising: a memory comprising executable instructions; and a processor configured to execute the executable instructions and cause the apparatus to perform a method in accordance with any one of Clauses 1-18.

Clause 20: An apparatus, comprising means for performing a method in accordance with any one of Clauses 1-18.

Clause 21: A non-transitory computer-readable medium comprising executable instructions that, when executed by a processor of an apparatus, cause the apparatus to perform a method in accordance with any one of Clauses 1-18.

Clause 22: A computer program product embodied on a computer-readable storage medium comprising code for performing a method in accordance with any one of Clauses 1-18.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. An apparatus for wireless communications at a first user equipment (UE), comprising:
   one or more memories comprising instructions; and
   one or more processors, individually or collectively, configured to execute the instructions to cause the apparatus to:
      detect at least one condition related to first resources reserved for sidelink transmissions in a first radio access technology (RAT); and
      perform one or more actions, based on the detection, to limit feedback request for sidelink transmissions in a second RAT, wherein at least one of the one or more actions indicates disabling a request for a feedback for at least one of the sidelink transmissions in the second RAT.

2. The apparatus of claim 1, wherein the first resources comprise resources overlapping with a physical sidelink feedback channel (PSFCH) slot.

3. The apparatus of claim 1, wherein:
   the first RAT corresponds to a long term evolution (LTE) RAT; and
   the second RAT corresponds to a new radio (NR) RAT.

4. The apparatus of claim 1, wherein the at least one condition relates to at least one of:

an amount of resources from a candidate set of resources within a resource selection window that are excluded, for the sidelink transmissions in the second RAT, due to reservation of the first resources, wherein the reservation overlaps with a physical sidelink feedback channel (PSFCH) slot associated with a resource; or detection of one or more reservations of the first resources for the sidelink transmissions in the first RAT.

5. The apparatus of claim 4, wherein the one or more processors, individually or collectively, are configured to execute the instructions to cause the apparatus to calculate the amount of resources excluded from the candidate set of resources.

6. The apparatus of claim 5, wherein the amount of resources are calculated based on counting at least one of:

a number of PSFCH slots comprising at least one of the first resources reserved for the sidelink transmissions in the first RAT;

a number of resources from the candidate set of resources that can not be selected by the first UE due to the reservation of the first resources, wherein the reservation overlaps with the PSFCH slot associated with the resource; or a subset of resources in the candidate set of resources from which a higher layer selects resources for one or more transmissions.

7. The apparatus of claim 4, wherein the one or more actions comprise:

the one or more processors, individually or collectively, configured to execute the instructions to cause the apparatus to disable the feedback request for at least one sidelink transmission in the second RAT when the amount of resources excluded from the candidate set of resources or a number of the one or more reservations of the first resources for the sidelink transmissions in the first RAT exceeds a threshold value.

8. The apparatus of claim 7, wherein the disable comprises at least one of:

change a cast type associated with the at least one sidelink transmission; or adjust a status of a flag associated with the at least one sidelink transmission.

9. The apparatus of claim 7, wherein the one or more processors, individually or collectively, are configured to execute the instructions to cause the apparatus to receive signaling indicating the threshold value.

10. The apparatus of claim 9, wherein the threshold value is one of a plurality of different threshold values corresponding to different priorities.

11. The apparatus of claim 1, wherein the one or more actions comprise:

the one or more processors, individually or collectively, configured to execute the instructions to cause the apparatus to decide whether to disable the feedback request for at least sidelink transmission in the second RAT when the at least one condition is met, based on a priority associated with the at least sidelink transmission.

12. The apparatus of claim 11, wherein the one or more processors, individually or collectively, are configured to execute the instructions to cause the apparatus to disable the feedback request, based on the priority.

13. The apparatus of claim 1, wherein:

the at least one condition indicates that the first resources are for a second UE, based on a current reservation status of a candidate set of resources; and the one or more actions comprise the one or more processors, individually or collectively, configured to execute the instructions to cause the apparatus to transmit a first signaling to the second UE, in response to the detection of the at least one condition.

14. The apparatus of claim 13, wherein the first signaling comprises at least one of:

an indication to disable the feedback request for at least one sidelink transmission in the second RAT; or an indication to transmit at least one feedback for the at least one sidelink transmission in the second RAT.

15. The apparatus of claim 13, wherein:

the one or more processors, individually or collectively, are configured to execute the instructions to cause the apparatus to detect a change in the current reservation status of the candidate set of resources;

the one or more actions comprise the one or more processors, individually or collectively, configured to execute the instructions to cause the apparatus to transmit a second signaling to the second UE, in response to the detection of the change in the current reservation status of the candidate set of resources; and the second signaling comprises an indication to enable the feedback request for at least one sidelink transmission in the second RAT.

16. The apparatus of claim 1, wherein:

the at least one condition relates to an indication from a second UE that the first resources are reserved for the sidelink transmissions in the first RAT; and the one or more actions comprise the one or more processors, individually or collectively, configured to execute the instructions to cause the apparatus to disable the feedback request for at least one sidelink transmission in the second RAT in accordance with the indication.

17. The apparatus of claim 16, wherein the indication is based on a value of a number of the first resources within a period.

18. The apparatus of claim 16, wherein the indication is based on a value of a reference signal receive power (RSRP) associated with a number of the first resources within a period.

19. A method for wireless communications at a first user equipment (UE), comprising:

detecting at least one condition related to first resources reserved for sidelink transmissions in a first radio access technology (RAT); and performing one or more actions, based on the detection, to limit feedback request for sidelink transmissions in a second RAT, wherein at least one of the one or more actions indicates disabling a request for a feedback for at least one of the sidelink transmissions in the second RAT.

20. A non-transitory computer-readable medium comprising instructions that, when executed by one or more processors of a first user equipment (UE), cause the first UE to perform a method of wireless communications, comprising:

detecting at least one condition related to first resources reserved for sidelink transmissions in a first radio access technology (RAT); and performing one or more actions, based on the detection, to limit feedback request for sidelink transmissions in a second RAT, wherein at least one of the one or more actions indicates disabling a request for a feedback for at least one of the sidelink transmissions in the second RAT.

* * * * *